United States Patent [19]

Inata et al.

[11] Patent Number: 5,068,062

[45] Date of Patent: Nov. 26, 1991

[54] REVERSIBLY COLOR-CHANGEABLE MATERIALS

[75] Inventors: Hiroo Inata; Shunichi Matsumura; Seiji Itoh; Masuhiro Okada, all of Iwakuni, Japan

[73] Assignee: Teijin Limited, Osaka, Japan

[21] Appl. No.: 333,257

[22] Filed: Apr. 5, 1989

[30] Foreign Application Priority Data

| Apr. 7, 1988 | [JP] | Japan | 63-84173 |
| Jun. 13, 1988 | [JP] | Japan | 63-143538 |
| Sep. 9, 1988 | [JP] | Japan | 63-224752 |
| Oct. 19, 1988 | [JP] | Japan | 63-261631 |
| Nov. 7, 1988 | [JP] | Japan | 63-279477 |

[51] Int. Cl.$^5$ ............................................. H01B 1/06
[52] U.S. Cl. ..................................... 252/518; 252/500; 252/512; 252/514; 252/520; 252/511; 359/241; 359/265; 523/457; 523/458; 523/459
[58] Field of Search ................. 252/500, 518; 350/356, 350/357; 523/457–459; 524/401, 80, 423, 414, 413, 417, 403

[56] References Cited

FOREIGN PATENT DOCUMENTS

| 0266708 | 10/1987 | European Pat. Off. . |
| 56-26977 | 3/1981 | Japan . |
| 59-217787 | 12/1984 | Japan . |
| 59-217791 | 12/1984 | Japan . |
| 61-151214 | 7/1986 | Japan . |
| 61-155411 | 7/1986 | Japan . |
| 61-204224 | 9/1986 | Japan . |

*Primary Examiner*—Josephine Barr
*Attorney, Agent, or Firm*—Sherman & Shalloway

[57] ABSTRACT

An electrochromic resin composition comprising (A) 100 parts by weight of a network comprising a crosslinked polymer containing 4,4'-diaminodiphenylmethane units in a form in which the amino groups in the formula are quaternized, and (B) 5 to 150 parts by weight of an electrolytic material uniformly dispersed in the network (A). The crosslinked polymer containing the units with the amino groups therein being in the quaternized state is useful as an electrochromic or photochromic material.

20 Claims, No Drawings

REVERSIBLY COLOR-CHANGEABLE MATERIALS

This invention relates to a material that changes in color reversibly. More specifically, it relates to a material that changes in color reversibly by external stimulation of thermal energy, light energy, electrical energy, etc.

A photochromic material which reversibly colors by the action of light and an electrochromic material which colors reversibly by the action of electricity have been extensively studied for use as various display elements, memory elements and light controlling materials.

Viologen has been well known as a compound which exhibits photochromism and electrochromism. Attempts have already been made to commercialize viologen since they can give brilliant colors and permit choice of colors according to the type of its derivatives.

An electrochromic display (ECD) using a solution of a low-molecular-weight viologen has not yet come into commercial acceptance because it has a short repetition life, and its memory life and response speed are insufficient.

A method was proposed in which a low-molecular-weight viologen is dissolved or dispersed in a soluble resin or its solution and optionally the solution or dispersion is coated on a substrate thereby to cause the viologen to function in the resin matrix. However, since the oxidation-reduction reactions of viologens are generally affected greatly by the polarity of the matrix resin used, it is difficult to have the inherent characteristics of the viologens exhibited fully. Furthermore, the insufficient solvent resistance of the matrix resin is a problem.

Japanese Laid-Open Patent Publication No. 26977/1981 discloses a photochromic composition comprising a high-molecular-weight viologen compound represented by the following formula

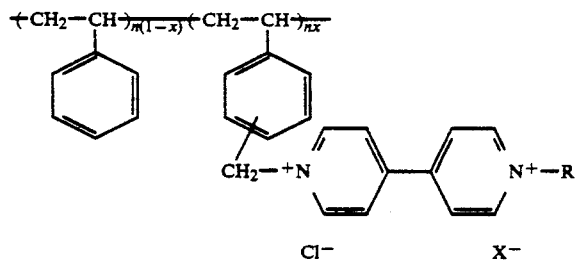

wherein R represents an alkyl or aralkyl group, X represents a halogen atom or an atomic grouping capable of forming a stable anion, n is a number of from 5 to 10,000, and x is a number of from 0.5 to 1.0, and a solid alcohol.

Japanese Laid-Open Patent Publication No. 217791/1984 discloses an electrochromic material comprising a compound obtained by reacting in aqueous solution a high-molecular-weight viologen derivative represented by the following formula

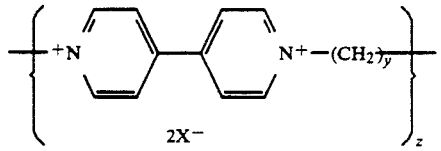

wherein X represents an anion, y represents a positive integer of from 8 to 10, and z represents a number showing the degree of polymerization, with a high-molecular-weight sulfonic acid.

Japanese Laid-Open Patent Publication No. 217787/1984 discloses an electrochromic material comprising the compound obtained by the reaction described in the above-cited Japanese Laid-Open Patent Publication No. 217791/1984 and an electrically conductive powder having a viologen group bound to its surface.

Japanese Laid-Open Patent Publication No. 151214/1986 discloses a polymeric material having a viologen group represented by the following formula

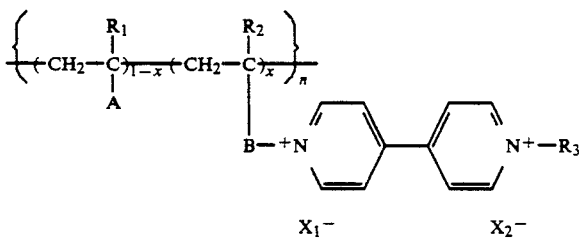

wherein A is a polar group, B is a group binding the carbon atom to the nitrogen atom, each of $R_1$ and $R_2$ is a hydrogen atom or an alkyl group, $R_3$ is an alkyl or aralkyl group, $X_1$ and $X_2$ are identical or different and each represents a halogen atom or an atomic grouping capable of forming a stable anion, x is 0.001 to 0.999, and n is at least 3.

Japanese Laid-Open Patent Publication No. 155411/1986 filed by the same applicant as in the above-cited Japanese Laid-Open Patent Publication No. 151214/1986 proposes a polymeric material having a viologen group of the above formula in which the polar group A is

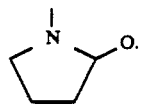

Japanese Laid-Open Patent Publication No. 204224/1986 discloses a functional elastomer having viologen units of the formula

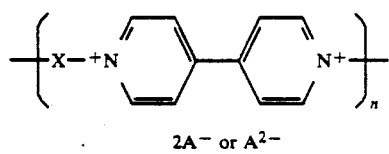

wherein X is a polyether and A is an anion, introduced into its main chain by cationic polymerization with a difunctional initiator.

None of these polymeric materials obtained by polymerizing viologens and immobilizing them have proved to be satisfactory in response speed and life.

On the other hand, poly(cyclic iminoethers) have previously been known as compounds capable of giving polymeric materials by reaction with aromatic amines.

Abstract of Papers Read in the 37th Meeting of Lectures and Discussions on Thermosetting Resins held on October 29 and 30, 1987 under the auspices of Japan Association of Synthetic Resin Industry gives at pages 21 and 24 a report of a study on crosslinked polyaminoamide obtained by reacting 2,2'-(1,3-phenylene)bis-2-oxazoline and 4,4'-methylenedianiline, m-xylylenediamine or isophorone diamine. In the preface of this paper, the authors state that there is no prior literature on the reaction between a bis-2-oxazoline and a diamine. The paper is primarily directed to the physical properties of the crosslinked polyaminoamide and gives consideration to its feasibility as a molding material.

A patent application including a description of the work disclosed in the above paper was laid-open on May 11, 1988 as European patent Application No. 0 266708-A1. This European Patent Application No. 0 266708-A1 discloses a crosslinked resin prepared by the reaction of a bis(2-oxazoline) compound with an aromatic compound having at least two amino groups. Its specification states that this resin has low water absorption, excellent strength and superior heat resistance and is tough.

It is an object of this invention to provide a novel reversibly color-changeable material.

Another object of this invention is to provide a novel resin composition which exhibits electrochromism.

Still another object of this invention is to provide a high-molecular-weight resin composition which exhibits electrochromism and has excellent response characteristics and reversibility in color change upon application or removal of a voltage.

Yet another object of this invention is to provide an electrochromic display element (to be abbreviated as the ECD element) by using the above high-molecular-weight resin composition of this invention.

A further object of this invention is to provide an ECD element which produces a brilliant color, has excellent durability and requires little power consumption.

Still further object of this invention is to provide a crosslinked polymer constituting the above resin composition of this invention as a photochromic material, particularly a photochromic material which colors upon ultraviolet irradiation and regains its original color upon application of heat or laser light with excellent response characteristics and reversibility.

A yet further object of this invention is to provide a practically advantageous method of repeatedly coloring the above photochromic material which comprises repeating a cycle of coloration and decoloration.

Other objects of this invention along with its advantages will become apparent from the following description.

According to this invention, the above objects and advantages are firstly achieved by an electrochromic resin composition comprising (A) 100 parts by weight of a network comprising a crosslinked polymer containing bonded units represented by the following formula (I)

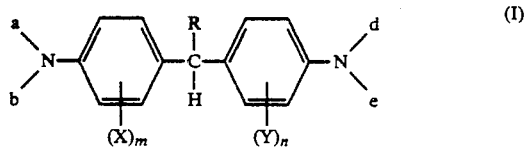

wherein R represents a hydrogen atom or a monovalent hydrocarbon group, X and Y, independently from each other, represent a halogen atom, a nitro group, a monovalent hydrocarbon group or a monovalent hydrocarbon-O— group, m and n, independently from each other, represent 0, 1, 2, 3 or 4, a, b, d and e are bonds which, independently from each other, are bonded to a hydrogen atom or to an aliphatic, alicyclic or aromatic carbon, provided that at least one of these bonds is bonded to the aliphatic, alicyclic or aromatic carbon, in a form in which the amino groups in the formula are quaternized, and (B) 5 to 150 parts by weight of an electrolytic material uniformly dispersed in the network (A).

In the above formula (I), R represents a hydrogen atom or a monovalent hydrocarbon group.

Preferably, the monovalent hydrocarbon group may be, for example, an alkyl, aralkyl, cycloalkyl or aryl group.

The alkyl group preferably has 1 to 5 carbon atoms, and may be linear or branched. Examples of the alkyl group include methyl and ethyl groups.

The aralkyl group is preferably an alkyl group having 1 to 3 carbon atoms and a phenyl group as a substituent. Examples of the aralkyl group include benzyl, methylbenzyl and phenethyl groups.

Preferably, the cycloalkyl group has 5 to 12 carbon atoms in the ring. Examples of the cycloalkyl group are cyclopentyl, and cyclohexyl groups.

Preferably, the aryl group may be, for example, a phenyl, biphenyl and tolyl group.

Especially preferably, R is a hydrogen atom, an alkyl group having 1 to 5 carbon atoms, or a phenyl group, above all the hydrogen atom.

In formula (I), X and Y, independently from each other, represent a halogen atom, a nitro group, a monovalent hydrocarbon group, or a monovalent hydrocarbon-O— group.

Examples of the halogen atoms are fluorine, chlorine and bromine.

The monovalent hydrocarbon group may be any of those which are exemplified above with regard to R. Above all, R is preferably an alkyl group having 1 to 5 carbon atoms.

The hydrocarbon moiety in the hydrocarbon-O— group may represent the same groups as exemplified above with regard to R. For example, when the hydrocarbon moiety is a lower alkyl group such as methyl or ethyl group, the monovalent hydrocarbon-O— group is a lower alkoxy group such as a methoxy or ethoxy group. Preferably, the monovalent hydrocarbon-O— group is an alkoxy group having 1 to 5 carbon atoms.

m and n, independently from each other, represent 0, 1, 2, 3 or 4, preferably 0 or 1, more preferably 0.

In formula (I), a, b, d and e are bonds which are bonded to the nitrogen atom in the formula, hydrogen atoms or further to an aliphatic, alicyclic or aromatic carbon, with the proviso that at least one of bonds a, b, d and e is bonded to the aliphatic, alicyclic or aromatic carbon.

The structural units of formula (I) are included as part of the structure of the crosslinked polymer.

It has been found by the present inventors that a resin composition capable of exhibiting electrochromism is obtained by uniformly dispersing an electrolyte in a network of the crosslinked polymer containing the structural units of formula (I) in a form in which the amino groups in the formula, at least partly, are quaternized.

The aliphatic, alicyclic or aromatic carbon to which at least one of the bonds a, b, d and e in formula (I) is bonded may exist in the bonded units of formula (I) incorporated in the network chain of the crosslinked polymer, or in the bonded units of formula (I) pendant from the network chain of the crosslinked polymer.

In other words, when the bonded units of formula (I) are incorporated in the network chain of the crosslinked polymer, at least two of the bonds a, b, d and e in formula (I), for example the two bonds a and d, are the aliphatic, alicyclic or aromatic carbons present in the bonded units of formula (I).

If the bonded units of formula (I) are pendant from the network chain of the crosslinked polymer, any one of the bonds a, b, d and e in formula (I) may be an aliphatic, alicyclic or aromatic carbon present in the bonded units of formula (I).

In the present specification, the aliphatic carbon means carbon in an aliphatic group. Likewise, the alicyclic or aromatic carbon means carbon in an alicyclic or aromatic group.

According to this invention, the structural units of formula (I) may be included as a member of the polymer chain of any type of polymers such as polyamides, polyurethanes, polyureas, polyesters, polyethers, polysulfones, polyimides, epoxy resins, polyolefins, polyamines and copolymers of these.

The structural units of formula (I) are formed in the crosslinked polymer by using a compound represented by the following formula (II)

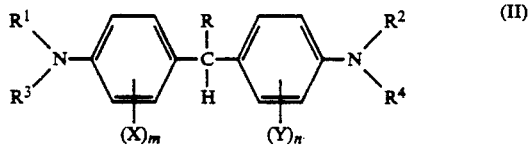

wherein R, X, Y, m and n are as defined above, and $R^1$, $R^2$, $R^3$ and $R^4$ are identical or different and each represents a hydrogen atom, a monovalent hydrocarbon group, provided that at least one of $R^1$ through $R^4$ represents a hydrogen atom or a hydrocarbon group having a polymer-forming functional group, as one of components forming the crosslinked polymer.

The polymer-forming functional group in formula (II) may be, for example, an amino, hydroxyl, epoxy or unsaturated group depending upon the type of the crosslinked polymer to be formed.

In formula (II), $R^1$, $R^2$, $R^3$ and $R^3$ are identical or different, and each represents a hydrogen atom, or a monovalent hydrocarbon group. Preferably, the monovalent hydrocarbon group may be, for example, an alkyl, alkenyl, cycloalkyl, cycloalkenyl or aryl group.

X, Y, m and n are the same as those defined with regard to formula (I).

Crosslinked polymers containing the structural units of formula (II) can be produced by the following reactions.

(1) When the compound of formula (II) is an epoxy compound, it is reacted with an amine compound containing at least two active hydrogens, a polycarboxylic acid, an intramolecular acid anhydride group of the polycarboxylic acid, polyphenol or a poly(cyclic iminoether), and the resulting crosslinked epoxy resin is then quaternized.

(2) When the compound of formula (II) is an amine compound, it is reacted with a poly(cyclic iminoether), a polyepoxy compound or a polyisocyanate, and the resulting crosslinked polymer is then quaternized.

(3) When the compound of formula (II) is a compound having an ethylenically unsaturated double bond, it is polymerized either alone or together with another ethylenically unsaturated compound, and the resulting crosslinked polymer is then quaternized.

(4) When the compound of formula (II) is a hydroxy compound, it is reacted with a polyisocyanate or a polycarboxylic acid, and the resulting crosslinked polymer is then quaternized.

These instances will be described below in detail.

The embodiment described in (1) above gives a crosslinked epoxy resin which is derived from a mixture comprising (a) an epoxyamine compound represented by the following formula (II-1)

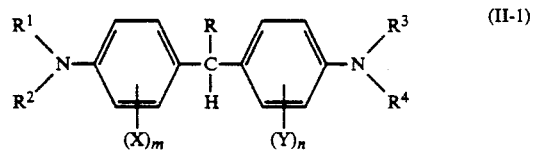

wherein R, X, Y, m and n are as defined with regard to formula (I), and $R^1$, $R^2$, $R^3$ and $R^4$ are identical or different and each represents a hydrogen atom, a monovalent hydrocarbon group having a 1,2-epoxy moiety, or a monovalent hydrocarbon group which may be substituted by a substituent inert to the 1,2-epoxy moiety, with the proviso that at least one of $R^1$, $R^2$, $R^3$ and $R^4$ is the monovalent hydrocarbon group having a 1,2-epoxy moiety, and (b) a compound selected from the group consisting of amine compounds having at least two active hydrogens, polycarboxylic acids, intramolecular anhydrides of the polycarboxylic acids, polyphenols and poly(cyclic imonoethers), and in which the amino groups in formula (II-1) are in the quaternized state.

In formula (II-1), $R^1$, $R^2$, $R^3$ and $R^4$ are identical or different and each represents a hydrogen atom, a monovalent hydrocarbon group having a 1,2-epoxy moiety, or a monovalent hydrocarbon group which may be substituted by a substituent inert to the 1,2-epoxy moiety. At least one of $R^1$ to $R^4$ is the monovalent hydrocarbon group having a 1,2-epoxy group.

Preferably, the monovalent hydrocarbon group having a 1,2-epoxy moiety is, for example, an alkyl or cycloalkyl group having a 1,2-epoxy moiety.

The monovalent hydrocarbon group which may be substituted by a substituent inert to the 1,2-epoxy moiety, that is, a substituent having no active hydrogen, such as a halogen atom or a nitro group may be, for example, an alkyl, cycloalkyl or aryl group.

Examples of the epoxyamine compound represented by formula (II-1) include
bis[4-N,N-di(2,3-epoxypropyl)aminophenyl]-methane,
bis[4-N,N-di(3,4-epoxybutyl)aminophenyl]-methane,
bis[4-N,N-di(4,5-epoxypentyl)aminophenyl]-methane,
bis[4-N,N-di(5,6-epoxyhexyl)aminophenyl]-methane,
bis[4-N-(2,3-epoxypropyl)aminophenyl]methane,
bis[4-N-3,4-epoxybutyl)aminophenyl]methane,
bis[4-N-(4,5-epoxypentyl)aminophenyl]methane,
bis[4-N-(5,6-epoxyhexyl)aminophenyl]methane,
1,1-bis[4-N,N-di(2,3-epoxypropyl)aminophenyl]-ethane,
1,1-bis[4-N,N-di(3,4-epoxybutyl)aminophenyl]-ethane,
1,1-bis[4-N,N-di(4,5-epoxypentyl)aminophenyl]-ethane,
1,1-bis[4-N,N-di(5,6-epoxyhexyl)aminophenyl]-ethane,
1,1-bis[4-N,N-di(2,3-epoxypropyl)aminophenyl]-propane,
1,1-bis[4-N,N-di(3,4-epoxybutyl)aminophenyl]-propane,
1,1-bis[4-N,N-di(4,5-epoxypentyl)aminophenyl]-propane,
1,1-bis[4-N,N-di(5,6-epoxyhexyl)aminophenyl]-propane,
bis[4-N-(2,3-epoxypropyl)-N-methylaminophenyl]-methane,
bis[4-N-(2,3-epoxypropyl)-N-ethylaminophenyl]-methane,
bis[4-N-(2,3-epoxypropyl)-N-propylaminophenyl]-methane,
bis[3-chloro-4-N,N-di(2,3-epoxypropyl)aminophenyl]methane,
bis[2-methyl-4-N,N-di(2,3-epoxypropyl)aminophenyl]methane,
bis[4-N-(2,3-epoxypropyl)-N-butylaminophenyl]methane,
bis[4-N-(2,3-epoxypropyl)-N-pentylaminophenyl]methane,
bis[4-N-(2,3-epoxypropyl)-N-benzylaminophenyl]methane,
and bis[4-N-(2,3-epoxypropyl-N-p-henylaminophenyl]methane.

Preferred among them are bis[4-N,N-di(2,3-epoxypropyl)aminophenyl]methane, bis[3-chloro-4-N,N-di(2,3-epoxypropyl)aminophenyl]methane and bis[2-methyl-4-N,N-di(2,3-epoxypropyl)aminophenyl]methane. The bis[(4-N,N-di(2,3-epoxypropyl)aminophenyl]methane is preferred.

Examples of the amine compounds (b) having at least two active hydrogens to be reacted with the epoxyamine compound (a) include
4,4'-diaminodiphenylmethane,
N,N'-dimethyl-4,4'-diaminodiphenylmethane,
N,N'-diethyl-4,4'-diaminodiphenylmethane,
N,N'-dipropyl-4,4'-diaminodiphenylmethane,
N,N'-dibenzyl-4,4'-diaminodiphenylmethane,
1,1-bis(4-aminophenyl)ethane,
1,1-bis(4-N-methylaminophenyl)ethane,
1,1-bis(4-ethylaminophenyl)ethane,
1,1-bis(4-N-propylaminophenyl)ethane,
1,1-bis(4-N-benzylaminophenyl)ethane,
1,1-bis(4-aminophenyl)propane,
1,1-bis(4-aminophenyl)butane,
1,1-bis(4-N-methylaminophenyl)propane,
1,1-bis(4-N-ethylaminophenyl)propane,
1,1-bis(4-N-propylaminophenyl)propane,
1,1-bis(4-N-benzylaminophenyl)propane,
bis(4-aminophenyl)phenylmethane,
bis(4-N-methylaminophenyl)phenylmethane,
bis(4-N-ethylaminophenyl)phenylmethane,
bis(2-methyl-4-aminophenyl)methane,
bis(3-methyl-4-aminophenyl)methane,
bis(2-ethyl-4-aminophenyl)methane,
bis(3-ethyl-4-aminophenyl)methane,
bis(3-chloro-4-aminophenyl)methane,
bis(2-bromo-4-aminophenyl)methane,
bis(3-bromo-4-aminophenyl)methane, and
Of these, 4,4'-diaminodiphenylmethane is especially preferred.

The polycarboxylic acids (b) may be, for example, aliphatic, alicyclic and aromatic polycarboxylic acids having at least two carboxyl groups in the molecule.

Examples of the polycarboxylic acids include aliphatic polycarboxylic acids such as succinic acid, adipic acid, sebacic acid, azelaic acid, decanedicarboxylic acid, dodecanedicarboxylic acid, dimeric acid, glutaric acid, maleic acid, fumaric acid, propane-1,2,3-tricarboxylic acid and furane-1,2,3,4-tetracarboxylic acid; alicyclic polycarboxylic acids such as cyclohexane-1,4-dicarboxylic acid, cyclohexane-1,3-dicarboxylic acid, cyclohexane-1,2-dicarboxylic acid, tetrahydrophthalic acid, dihydrophthalic acid, 1,2-cyclopentanedicarboxylic acid and 1,3-cyclopentanedicarboxylic acid; and aromatic polycarboxylic acid such as terephthalic acid, isophthalic acid, phthalic acid, naphthalenedicarboxylic acid, trimellitic acid, trimesic acid, diphenyldicarboxylic acid, methylterephthalic acid and methylisophthalic acid.

A certain minor proportion of the polycarboxylic acids may be replaced by hydroxycarboxylic acids such as salicylic acid, m-hydroxybenzoic acid, p-hydroxybenzoic acid, 6-hydroxy-2-naphthoic acid, 3-hydroxy-2-naphthoic acid and omega-hydroxycaproic acid.

The intramolecular anhydrides of the polycarboxylic acids are intramolecular anhydrides of the above-exemplified polycarboxylic acids, for example succinic anhydride.

Examples of the polyphenol compounds (b) include
hydroquinone,
resorcinol,
methylhydroquinone,
chlorohydroquinone,
t-butylhydroquinone,
t-amylhydroquinone,
fluorohydroquinone,
bromohydroquinone,
2,5-dichlorohydroquinone,
pyrogallol,
catechol,
1,3,5-trihydroxybenzene,
2,2-bis(4-hydroxyphenyl)propane,
4,4'-dihydroxydiphenyl,
4,4'-dihydroxydiphenyl ether,
4,4'-dihydroxydiphenyl sulfide,
4,4'-dihydroxydiphenylmethane,
1,1-bis(4-hydroxyphenyl)cyclohexane, phenolphthalein,
1,1-bis(4-hydroxyphenyl)ethane,
2,2-bis(3-methyl-4-hydroxyphenyl)propane,
2,2-bis(3,5-dimethyl-4-hydroxyphenyl)propane,
3,4'-dihydroxydiphenyl ether,
dihydroxynaphthalene,
bis(4-hydroxyphenyl)sulfone,
2,2-bis(3,5-dichloro-4-hydroxyphenyl)propane,
2,2-bis(3-chloro-4-hydroxyphenyl)propane,
2,2-bis(3-bromo-4-hydroxyphenyl)propane,
2,2-bis(3,5-dibromo-4-hydroxyphenyl)propane, 2,2-bis(4-hydroxyphenyl)hexafluoropropane, and
polyol compounds obtained by the condensation of phenols and aldehydes.

In the polyol compounds obtained by the condensation of phenols and aldehydes, the phenols denote aromatic hydroxyl-containing compounds and specifically include, for example, phenol, cresol, hydroquinone, resorcinol, xylenol, alpha-naphthol, beta-naphthol and dihydroxynaphthalene. Specific examples of the aldehydes are formaldehyde, acetaldehyde, glyoxal, glutalaldehyde, benzaldehyde, p-hydroxybenzaldehyde, m-hydroxybenzaldehyde and terephthalaldehyde. Phenol novolak is a typical example of the polyol compounds.

Examples of the poly(cyclic iminoethers) include oxazoline derivatives represented by the following formula (III-1)

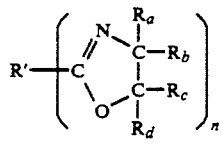
(III-1)

wherein n represents an integer of 1 to 4, R' represents an aliphatic, alicyclic or aromatic hydrocarbon group having a valence of n, and where n is 2, R' may be a direct bond, and $R_a$, $R_b$, $R_c$ and $R_d$ are identical or different and each represents a hydrogen atom, an alkyl group having not more than 3 carbon atoms, or an aryl group having not more than 7 carbon atoms, and oxazines represented by the following formula (III-2)

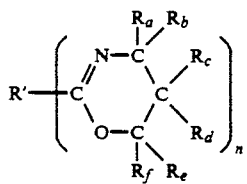
(III-2)

wherein n and R' are as defined above, and $R_a$, $R_b$, $R_c$, $R_d$, $R_e$ and $R_f$ are identical or different and each represents a hydrogen atom, an alkyl group having not more than 3 carbon atoms, or an aryl group having not more than 7 carbon atoms.

In these formulae (III-1) and (III-2), n represents an integer of 1 to 4, preferably 2. R' represents an aliphatic, alicyclic and aromatic hydrocarbon group having a valence of n. Where n is 2, R' may be a direct bond. Examples of R' are methyl, ethyl, propyl, butyl, amyl, hexyl, decyl, cyclopentyl, cyclohexyl, phenyl, substituted phenylnaphthyl and substituted naphthyl when n is 1; ethylene, trimethylene, propylene, tetramethylene, hexamethylene, neopentylene, p-phenylene, m-phenylene and cyclohexylene when n is 2;

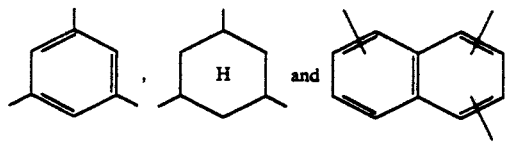

and when n is 3; and

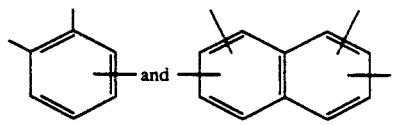

when n is 4.

Each of $R_a$, $R_b$, $R_c$, $R_c$, $R_e$ and $R_f$ represents a hydrogen atom, an alkyl group having not more than 3 carbon atoms such as a methyl or ethyl group, or an aryl group having not more than 7 carbon atoms such as a phenyl or tolyl group. They may be identical or different. Preferably, all of $R_a$ to $R_f$ are hydrogen atoms, or any one of them is a methyl group and the rest are hydrogen atoms.

Examples of the oxazoline derivatives of formula (III-1) include
2-methyl-2-oxazoline,
2-ethyl-2-oxazoline,
2-phenyl-2-oxazoline,
2-tolyl-2-oxazoline,
2-phenyl-5-methyl-2-oxazoline,
2-nitrophenyl-2-oxazoline,
2,2'-bis(2-oxazoline),
2,2'-ethylenebis(2-oxazoline),
2,'-tetramethylenebis(2-oxazoline),
2,2-hexamethylenebis(2-oxazoline),
2,2'-octamethylenebis(2-oxazoline),
2,2'-1,4-cyclohexylenebis(2-oxazoline),
2,2'-bis(4-methyl-2-oxazoline),
2,2'-bis(5-methyl-2-oxazoline),
2,2'-m-phenylenebis(2-oxazoline),
2,2'-p-phenylenebis(2-oxazoline),
2,2'-m-phenylenebis(4-methyl-2-oxazoline),
2,2'-m-phenylenebis(5-methyl-2-oxazoline),
2,2'-m-phenylenebis(4,4'-dimethyl-2-oxazoline),
2,2'-p-phenylenebis(4-methyl-2-oxazoline),
2,2'-p-phenylenebis(4,4'-dimethyl-2-oxazoline),
2,2'-p-phenylenebis(5-methyl-2-oxazoline), and
1,3,5-tris(2-oxazolinyl-2)benzene.

Among them, 2,2'-bis(2-oxazoline), 2,2'-tetramethylenebis(2-oxazoline), 2,2'-m-phenylenebis(2-oxazoline), 2,2'-p-phenylenebis(2-oxazoline), 2,2'-m-phenylenebis(5-methyl-2-oxazoline) and 2,2'-p-phenylenebis(5-ethyl-2-oxazoline) are preferred.

Examples of the oxazine derivatives represented by formula (III-2) include
2-methyl-5,6-dihydro-4H-1,3-oxazine,
2-ethyl-5,6-dihydro-4H-1,3-oxazine,
2-phenyl-5,6-dihydro-4H-1,3-oxazine,
2-phenyl-6-methyl-5,6-dihydro-4H-1,3-oxazine,
2,2'-bis(5,6-dihydro-4H-1,3-oxazine),
2,2'-ethylenebis(5,6-dihydro-4H-1,3-oxazine),
2,2'-tetramethylenebis(5,6-dihydro-4H-1,3-oxazine),
2,2'-hexamethylenebis(5,6-dihydro-4H-1,3-oxazine),
2,2'-octamethylenebis(5,6-dihydro-4H-1,3-oxazine),
2,2'-1,4-cyclohexylenebis(5,6-dihydro-4H-1,3-oxazine),
2,2'-bis(4-methyl-5,6-dihydro-4H-1,3-oxazine),
2,2'-bis(5-methyl-5,6-dihydro-4H-1,3-oxazine),
2,2'-bis(6-methyl-5,6-dihydro-4H-1,3-oxazine),
2,2'-m-phenylenebis(5,6-dihydro-4H-1,3-oxazine),
2,2'-p-phenylenebis(5,6-dihydro-4H-1,3-oxazine),
2,2'-m-phenylenebis(4-methyl-5,6-dihydro-4H-1,3-oxazine),
2,2'-m-phenylenebis(5-methyl-5,6-dihydro-4H-1,3-oxazine), 2,2'-m-phenylenebis(6-methyl-5,6-dihydro-4H-1,3-oxazine),
2,2'-p-phenylenebis(4-methyl-5,6-dihydro-4H-1,3-oxazine),
2,2'-p-phenylenebis(5-methyl-5,6-dihydro-4H-1,3-oxazine), and
2,2'-p-phenylenebis(6-methyl-5,6-dihydro-4H-1,3-oxazine).

Of these, 2,2'-bis(5,6-dihydro-4H-1,3-oxazine), 2,2'-tetramethylenebis(5,6-dihydro-4H-1,3-oxazine), 2,2'-m-phenylenebis(5,6-dihydro-4H-1,3-oxazine) and 2,2'-p-phenylenebis(5,6-dihydro-4H-1,3-oxazine) are preferred.

A crosslinked epoxy resin may be produced, for example, by the following methods from a mixture of the epoxyamine compound (a) and at least one compound (b) selected from the group consisting of the amine compounds, polycarboxylic acids, intramolecular anhydrides thereof, polyphenols and cyclic iminoethers.

(A) A method which comprises forming a uniform solution of the mixture using an organic solvent or without using a solvent, coating the solution on various electrodes, a sheet, a film, or a molded article, and reacting it under heat.

(B) A method which comprises intimately mixing the mixture, filling it into a mold of a desired shape, and reacting it under heat.

The proportions of the reactants differ accord-ing to the reaction system employed, but may be in accordance with known proportions generally employed in the system. Preferably, they are near the equivalent weights.

The reaction temperature differs depending upon the types and proportions of the reactants, and is, for example, room temperature to about 300° C., preferably about 50° to 250° C.

The reaction time may be a period of time required for the resin to cure sufficiently. It varies depending upon the types and proportions of the starting materials used, and the reaction temperatures. It is preferably 1 minute to 3 hours, more preferably 3 minutes to 2.5 hours, especially preferably 5 minutes to about 2 hours.

The reaction may be carried out under atmospheric to elevated pressure. To prevent the influence of moisture in the atmosphere or oxidative degradation of the resin, the reaction is preferably carried out in an atmosphere of an inert gas such as nitrogen or argon.

In the above crosslinking reaction, an epoxy compound which differs from the epoxyamine compound of formula (II-1) may be used.

Such an epoxy compound may be a polyepoxide having at least two epoxy groups in the molecule. Its examples are given below.

1) Glycidyl ether-type compounds

Aromatic polyols such as 2,2-bis(4-hydroxyphenyl)-propane (bisphenol A), 4,4'-dihydroxydiphenylmethane, 4,4'-dihydroxydiphenylsulfone, resorcinol, phenol novolak, cresol novolak, resorcinol novolak, naphthol novolak, dihydroxynaphthalene, and dihydroxynaphthalene novolak; polyols obtained by the dehydration reaction of aromatic hydroxy compounds such as phenol, dihydroxybenzene, naphthol and dihydroxynaphthalene and aldehydes such as glyoxal, glutaraldehyde, p-hydroxy-benzaldehyde and in the presence of, for example, acid catalysts; and glycidyl ethers of polyhydric alcohols such as butanediol, polypropylene glycol, polyethylene glycol and glycerol, and precursor polymers thereof.

2) Glycidyl ester-type compounds

Glycidyl esters of dicarboxylic acids such as phthalic acid, isophthalic acid, tetrahydrophthalic acid and naphthalenedicarboxylic acid, and precursor polymers thereof.

3) N-glycidyl-type compounds

Compounds obtained by substituting a glycidyl group for active hydrogen bonded to the nitrogen atom of nitrogen-containing compounds such as aniline, isocyanuric acid and methylenedianiline.

4) Glycidyl ether ester-type compounds

Glycidyl ether esters of hydroxycarboxylic acids such as p-hydroxybenzoic acid and hydroxynaphthoic acid.

5) Others

Epoxy resins obtained from alicyclic compounds such as cyclopentadiene and dicyclopentadiene, a triglycidyl compound of p-aminophenol, and vinylcyclohexene dioxide.

Of these, preferred in view of availability and the thermal resistance of the resulting resin are a diglycidyl ether of 2,2-bis(4-hydroxyphenyl)propane (bisphenol A), a diglycidyl ether of 4,4'-dihydroxydiphenylmethane, a polyglycidyl ether of phenol novolak, a polyglycidyl ether of naphthol novolak, a polyglycidyl ether of a polyol obtained by the dehydration reaction of phenol with glyoxal, glutaraldehyde, benzaldehyde or p-hydroxybenzaldehyde, a diglycidyl ether of polypropylene glycol, a diglycidyl ether of polyethylene glycol, a diglycidyl ether of glycerol, a triglycidyl ether of glycerol, a diglycidyl ether ester of p-hydroxybenzoic acid, a diglycidyl ether ester of 2-hydroxy-6-naphthoic acid, a triglycidyl compound of p-aminophenol and vinylcyclohexene dioxide. Especially preferred are the diglycidyl ether of bisphenol A, the diglycidyl ether of phenol novolak, the polyglycidyl ether of alpha-naphthol novolak, the diglycidyl ether of a polyol obtained by the dehydration reaction of phenol with glyoxal, glutaraldehyde, benzaldehyde or p-hydroxybenzaldehyde in the presence of an acid catalyst, the diglycidyl ether of polyethylene glycol, the diglycidyl ether of butanediol, the diglycidyl ether of glycerol, the triglycidyl ether of glycerol, the triglycidyl compound of p-aminophenol, and vinylcyclohexene dioxide. They may be used either singly or in combination with each other.

Desirably, the polyepoxy compound which differs from the epoxyamine compound of formula (II-1) is used in an amount of not more than 50 moles, particularly not more than 30 moles, per mole of the epoxyamine compound.

The reversibly color-changeable resin of this invention can be obtained by quaternizing at least a part, for example, at least 1 equivalent percent of the amino groups in the above crosslinked polymer.

The quaternization treatment may be carried out, for example, by treatment with an acid, a salt, an alkyl halide or an acid ester.

Examples of the acid used are sulfuric acid, hydrochloric acid, nitric acid, acetic acid, phosphorous acid, phosphoric acid, benzenesulfonic acid, p-toluenesulfonic acid, methanesulfonic acid and ethanesulfonic acid.

Examples of the salt used are tetrabutyl ammonium chloride, tetrabutyl ammonium bromide, tetrabutyl ammonium perchlorate, tetramethyl ammonium chloride, tetramethyl ammonium chloride, lithium bromide and lithium chloride.

Examples of the alkyl halide used are methyl iodide, ethyl iodide, propyl iodide, butyl iodide, benzyl iodide and benzyl bromide.

Examples of the acid ester used are methyl benzenesulfonate, ethyl benzenesulfonate, methyl p-toluenesulfonate, ethyl p-toluenesulfonate, dimethyl sulfate, trimethyl phosphate and triphenyl phosphate.

The monomeric mixture is cured to form a crosslinked polymer, and then the polymer is impregnated and reacted with the above acid, salt, alkyl halide or acid ester. Alternatively, before the monomeric mixture is cured, the acid, alkyl halide or the acid ester is added to the mixture. Then, the mixture is heated to perform curing (crosslinking) and quaternization of the amino groups simultaneously. The two methods may be used in combination.

The impregnation of the treating agent may be effected by, for example, dissolving a quaternizing agent (such as the acid, salt, alkyl halide or acid ester) in water or in an organic solvent such as acetone and methanol, immersing the cured polymer in the solution to permit permeation of the quaternizing agent in the resin optionally by heating, and reacting the quaternizing agent with the amino groups in the resin.

Desirably, the resin composition of this invention to be used as an electrochromic material is prepared by using the salt as the quaternizing agent because the salt quaternizes the amino groups and also acts as an electrolyte.

The crosslinked polymer in the embodiment (1) described above can be produced as above. It is preferred in this embodiment to use an epoxyamine compound of formula (II-1) in which at least two of $R^1$ to $R^4$ are monovalent hydrocarbon groups having a 1,2-epoxy moiety alone or with the other polyepoxy compound described above.

The embodiment (2) will now be described in detail. This embodiment gives a crosslinked polymer which is derived from a mixture of (a') an amine compound represented by the following formula (II-2)

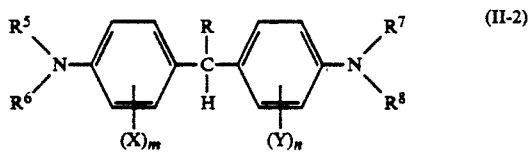
(II-2)

wherein R, X, Y, m and n are as defined hereinabove, and $R^5$, $R^6$, $R^7$ and independently from each other, represent a hydrogen atom or a monovalent hydrocarbon group which may be substituted by a substituent other than a 1,2-epoxy group with the proviso that at least two of $R^5$, $R^6$, $R^7$ and are hydrogen atoms, and (b') a compound selected from the group consisting of poly(cyclic iminoethers), polyepoxy compounds and polyisocyanates, and in which the amino groups in formula (II-2) are in the quaternized state.

In formula (II-2), $R^5$, $R^6$, $R^7$ and independently from each other, represent a hydrogen atom or a monovalent hydrocarbon group which may be substituted by a substituent other than a 1,2-epoxy group.

The monovalent hydrocarbon group may be, for example, an alkyl, aralkyl, cycloalkyl or aryl group.

Examples of the hydrocarbon group include alkyl groups such as methyl, ethyl, propyl, butyl, pentyl, hexyl and heptyl groups, aralkyl groups such as a benzyl group, cycloalkyl groups such as a cyclohexyl group and aryl groups such as phenyl, tolyl and diphenyl groups. R is preferably a hydrogen atom or an alkyl group, particularly the former. $R^5$ and $R^7$ preferably represents a hydrogen atom, an alkyl group or an aralkyl group.

Specific examples of the diamino compound (a') include
4,4'-diaminodiphenylmethane,
N,N'-dimethyl-4,4'-diaminodiphenylmethane,
N,N'-diethyl-4,4'-diaminodiphenylmethane,
N,N'-dipropyl-4,4'-diaminodiphenylmethane,
N,N'-dibenzyl-4,4'-diaminodiphenylmethane,
1,1-bis(4-aminophenyl)ethane,
1,1-bis(4-N-methylaminophenyl)ethane,
1,1-bis(4-N-ethylaminophenyl)ethane,
1,1-bis(4-N-propylaminophenyl)ethane,
1,1-bis(4-N-benzylaminophenyl)ethane,
1,1-bis(4-aminophenyl)propane,
1,1-bis(4-aminophenyl)butane,
1,1-bis(4-N-methylaminophenyl)propane,
1,1-bis(4-N-ethylaminophenyl)propane,
1,1-bis(4-N-propylaminophenyl)propane,
1,1-bis(4-N-benzylaminophenyl)propane,
bis(4-aminophenyl)phenylmethane,
bis(4-N-methylaminophenyl)phenylmethane, and
bis(4-N-ethylaminophenyl)phenylmethane.
Of these, 4,4'-diaminodiphenylmethane is preferred.

The diamino compounds may be used singly or in combination with each other.

The other reactant to be reacted with the amine compound (a') of formula (II-2) is selected from the group consisting of polycyclic iminoethers, polyepoxy compounds and polyisocyanates.

The polyepoxy compounds may be the same as the polyepoxy compounds other than the epoxyamine compounds of formula (II-1) which are exemplified hereinabove.

The poly(cyclic iminoethers) may be the same as those exemplified above in the embodiment (1).

The polyisocyanates are preferably aromatic, aliphatic and alicyclic compounds having at least two isocyanate groups in the molecule, and modification products of these compounds.

Specific examples of the polyisocyanates are aromatic polyisocyanates such as 2,4-tolylene diisocyanate, 2,6-tolylene diisocyanate, 4,4'-diphenylmethane diisocyanate, polymethylene polyphenyl isocyanate and xylylene diisocyanate; alicyclic polyisocyanates such as isophorone diisocyanate and methylenebis(cyclohexyl isocyanate), aliphatic polyisocyanates such as hexamethylene diisocyanate, and dimers, trimers, prepolymer-type modification products, carbodiimide-modified products and urea-modified products of these polyisocyanates.

Methods same as the methods (A) and (B) described in the embodiment (1) above may be used for producing a crosslinked resin from a mixture of the amine compound (a') of formula (II-2) and at least one compound (b') selected from the group consisting of poly(cyclic iminoethers), polyepoxy compounds and polyisocyanates. The reaction conditions may be nearly the same as those described in the embodiment (1).

In this crosslinking reaction, a polyamine compound which differs from the amine compounds of formula (II-2) may be used. The polyamine compound is preferably a compound containing at least two primary amino groups and/or secondary amino groups in the molecule. Specific examples include
piperadine,
1-(2-aminoethyl)piperadine,
4,4'-diaminodiphenylsulfone,
3,3'-diaminodiphenylsulfone,
4,4'-diaminodiphenyl ether,
3,4'-diaminodiphenyl ether,
4,4'-diaminobenzophenone,
3,3'-diaminobenzophenone,
p-phenylenediamine,
m-phenylenediamine,
p-xylylenediamine,
m-xylylenediamine,
diaminonaphthalene,
4,4'-diaminodiphenylsulfide,
2,4-diaminotoluene,
2,6-diaminotoluene,
1,2-diaminoethane,
3,5-diethyl-2,4-diaminotoluene,
3,5-diethyl-2,6-diaminotoluene,
2,4,6-triethyl-m-phenylenediamine,
2,6-dimethyl-4-t-butyl-m-phenylenediamine,
4,6-diisopropyl-m-phenylenediamine,
2-chloro-p-phenylenediamine,
chlorodiaminotoluene,
bis(3,5-diisopropyl-4-aminophenyl)methane, and
polymethylene polyphenyl polyamine.

The polyamine compound may be used in an amount of not more than 50 moles, particularly not more than 30 moles, per mole of the amine compound of formula (II-2).

Quaternization of the resulting crosslinked resin may be effected as in the embodiment (1) described above.

The embodiment (3) will be described below in detail.

The embodiment (3) gives a crosslinked polymer obtained by the addition-polymerization of an ethylenically unsaturated compound represented by the following formula (II-3)

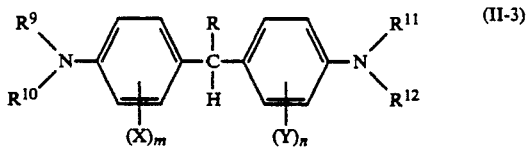

(II-3)

wherein R, X, Y, m and n are as defined hereinabove, $R^9$, $R^{10}$, $R^{11}$ and $R^{12}$, independently from each other represent a hydrogen atom, a monovalent hydrocarbon group having an ethylenically unsaturated bond, or a monovalent hydrocarbon group having no ethylenically unsaturated bond, with the proviso that at least two of $R^9$ through $R^{12}$ are monovalent hydrocarbon groups having an ethylenically unsaturated bond, or a mixture of it with another ethylenically unsaturated compound and in which the amino groups in formula (II-3) are in the quaternized state.

In formula (II-3), $R^9$, $R^{10}$, $R^{11}$ and $R^{12}$, independently from each other, represent a hydrogen atom, a monovalent hydrocarbon group having an ethylenically unsaturated bond, or a monovalent hydrocarbon group having no ethylenic unsaturated bond, and at least two of $R^9$ to $R^{12}$ are monovalent hydrocarbons having an ethylenically unsaturated bond.

Examples of the monovalent hydrocarbon may be the same as those of the monovalent hydrocarbon group exemplified above with regard to formula (II-2).

An allyl group is preferred as the monovalent hydrocarbon group having an ethylenically unsaturated bond.

Preferred examples of the ethylenically unsaturated compound of formula (II-3) include bis(4-N-allylaminophenyl)methane and bis(4-N,N-diallylaminophenyl)methane.

In the embodiment (3), the ethylenically unsaturated compound of formula (II-3) may be addition-polymerized alone or with another ethylenically unsaturated compound. Examples of the other ethylenically unsaturated compound include triallyl isocyanurate, triallyl cyanurate, diallyl isophthalate, diallyl phthalate and 2,2-bis(3-allyl-4-hydroxyphenyl)propane.

The other ethylenically unsaturated compound is used, for example, in an amount of not more than 50 moles, preferably not more than 30 moles, per mole of the ethylenically unsaturated compound of formula (II-3).

The addition-polymerization for the production of the crosslinked polymer may be carried out by the same methods as (A) and (B) described hereinabove.

The embodiment (4) will be described.

In the embodiment (4), the compound of formula (II) is a hydroxyl compound, and bis [4-N-(hydroxyethyl)aminophenyl]methane and bis [4-N,N-bis(hydroxyethyl)aminophenyl]methane, for example, are used as the compound of formula (II).

The polyisocyanate to be reacted with the hydroxyl compound may be the same as those exemplified with respect to the embodiment (2). The polycarboxylic acid to be reacted with the hydroxyl compound may be the same as those exemplified with regard to the embodiment (1).

The polymerization in the embodiment (4) may be carried out by the same methods as the methods (A) and (B) described in the embodiment (1).

The polymerization conditions may be those known in the production of polyesters or polyurethanes.

Quaternization treatment of the crosslinked polymer may be carried out under the same conditions as described in the embodiment (1).

In the case of using the cyclic iminoether in the embodiments (1) and (2), it is advantageous to use, for example, a protonic acid, a protonic acid ester, a Lewis acid, a Lewis acid complex, an alkyl halide, iodine, a halogenated phenol compound, or an alkali or alkaline earth metal compound of the following formula $$M(Z)l \qquad (IV)$$

wherein M represents an alkali metal or an alkaline earth metal, Z represents $BF_4$, $PF_6$, $SbF_8$ or ClO, and l represents 1 or 2, as a catalyst.

Specific examples of these catalysts excluding those of formula (IV) are described in European Laid-Open Patent Application No. 273368 (laid-open on July 6, 1989).

Examples of the alkali or alkaline earth metal compound of formula (IV) are $LiBF_4$, $NaBF_4$, $KBF_4$, $LiPF_9$, $NaPF_6$, $Mg(BF_4)_2$, $Ca(BF_4)_2$, $LiSbF_6$, $NaSbF_6$ and $NaClO_4$.

These catalysts may be used singly or in combination with each other. There is no particular limitation to the amount of the catalyst used. Preferably, it is about 0.01 to 70 mole % based on the cyclic iminoether compound used.

The crosslinked polymer containing the bonded units of formula (I) in a form in which the amino groups in the formula are quaternized may be used as an electrochromic material.

The crosslinked polymer in this invention gives an electrochromic material by forming it into a resin composition together with an electrolyte dispersed uniformly in a network of the crosslinked polymer.

The electrolyte is preferably an alkali metal salt or an ammonium salt of an organic or inorganic acid. Examples include alkali metal salts such as KBr, KCl, KI, LiCl, $K_2SO_4$, $KClO_4$, $LiClO_4$, $KBP_4$, $KH_2PO_4$, $KNO_3$ and $CH_3COOK$; and ammonium salts such as cetyl trimethyl ammonium chloride, cetyl trimethyl ammonium bromide, tetramethyl ammonium perchlorate, tetrabutyl ammonium bromide, tetraethyl ammonium perchlorate and tetrabutyl ammonium perchlorate.

The proportion of the electrolyte is preferably 5 to 150 parts by weight, more preferably 10 to 120 parts by weight, especially preferably 20 to 100 parts by weight, per 100 parts by weight of the network comprising the crosslinked polymer containing the bonded units of formula (I) in which the amino groups in formula (I) are in the quaternized state.

According to this invention, this polymeric electrochromic material colors blue or green, for example, by application of a weak voltage in a solution of the electrolyte, and by application of a backward voltage, reversibly changes to the original color. This method will be described below in detail.

When the electrochromic material in accordance with this invention is to be used as an electrochromic electrode, the electrode can be prepared, for example, as follows.

1. The monomeric mixture before heat curing (crosslinking), either as such or as a uniform solution in an organic solvent, is coated on a substrate such as a known conductive polymer, film or electrode, and then heat-cured. The resulting crosslinked resin is bonded to the substrate in an intimately contacting state at a low electrical resistance value (bonding method).

2. The known conductive polymer, film or electrode is not used, and the polymeric electrochromic material of this invention alone is used as an electrode (direct method).

In order to bond the polymeric electrochromic material of this invention to the conductive polymer, film or electrode at a lower electrical resistance value by the bonding method, various adhesive substances containing various conductive polymers, conductive inorganic compounds, conductive organic compounds or electrolytes may be interposed between the polymeric electrochromic material and the conductive polymer, film or electrode.

In the bonding method and the direct method, the polymeric electrochromic material may contain various conductive polymers, conductive inorganic compounds, conductive organic compounds or electrolyte in order to increase its conductivity.

The conductive polymers may be, for example, poly(vinylbenzyltrimethyl chloride), various ion exchange resins and various polymeric electrolytes. The conductive inorganic compounds may be, for example, silver powder, silver oxide, silver nitrate, copper, aluminum, gold, platinum, tin oxide, indium oxide, zinc oxide, titanium oxide, cadmium tin oxide, and carbon. The conductive organic compounds may be, for example, polypyrrole, poly-p-phenylene and polyacetylene.

Examples of the adhesive substances include thermoplastic resins such as a polyvinylidene chloride, ionomer resin, an AAS resin, an ABS resin, an MBS resin, an ethyene/vinyl acetate copolymer, a polyvinyl acetate, polybutadiene, poly(N-vinyl-2-pyrrolidone), poly(N,N-dimethyl acrylamide), poly(2-hydroxyethyl acrylate), polyacrylamide, polyethylene, polystyrene, polypropylene, polycarbonate, polymethyl methacrylate, polyvinyl buryral, a phenoxy resin, a fluorine resin, polyacetal, polyamides, polyesters, polyamideimides, polyarylates, polyetherimide, polyetheretherimides, polycarbonates, polysulfones, polyphenylene sulfides and poly(methylpentene); thermosetting resins such as phenolic resins, unsaturated polyester resins, polyurethane, guanamine resins, diallyl phthalate resins, vinyl ester resin, furan resins, polyimide resins, epoxy resins, malemine resins, urea resins and bisoxazoline resins; derivatives of natural polymers such as cellulose acetate and carboxymethyl cellulose, natural or synthetic resin or derivatives of these resins, generally called varnishes, such as poly(sodium styrenesulfonate), poly(sodium acrylate), poly(sodium vinylsulfonate), poly(trimethyl ethyl methacrylate), and sodium chondroitinsulfate.

These adhesive substances may be used singly or in combination.

Introduction of various conductive polymers, conductive inorganic compounds, conductive organic compounds or electrolytes into the electrochromic electrode may be effected by (1) mixing such compounds with the monomeric mixture before curing in the aforesaid method of producing the electrochromic electrode, or (2) preparing a solution or dispersion from such compounds and an organic solvent, immersing a pre-produced electrode having a cured coating in the solution or dispersion and heating the coating.

There is no particular limitation on the proportion of the conductive polymer, conductive inorganic compound, conductive organic compound or electrolyte used. For example, it is preferably not more than 70%, more preferably not more than 60%, more preferably not more than 50%.

Various organic solvents and various resins may be incorporated in the polymeric electrochromic material in order to increase affinity between the polymeric electrochromic material of the invention and the electrolyte solution, aid in the coloration of the polymeric electrochromic material, and to increase the dimensional stability of the electrochromic material.

There is no particular limitation on the organic solvents used for these purposes. Polar solvents are preferred, and specific examples include methanol, ethanol, ethylene glycol, N-methyl-2-pyrrolidone, dimethylformamide, N,N-dimethylacetamide, dioxane, dimethyl sulfoxide, propylene carbonate, sulfolane, pyridine and acetonitrile. These solvents may be used singly or in combination. The resins used for the above purposes may be the same as specific examples of the adhesive substances mentioned above.

There is no particular restriction on the amount of the organic solvent or the solvent used. For example, it is preferably not more than 80% by weight, more preferably not more than 70%, based on the total weight of the electrochromic material and other material incorporated therein. The method of mixing these substances may be the same as those used in incorporating the conductive polymers, etc.

The above method can produce an electrode having a coating of the polymeric electrochromic material of the invention. This electrode repeatedly colors and decolors by application of voltages in an electrolyte solution.

Water or various organic solvents may be used to dissolve the electrolyte. They may be used singly or in combination. The electrolyte may be any of the conductive polymers, conductive inorganic compounds, conductive organic compounds and electrolyte exemplified above. The concentration of the electrolyte in the solution is not particularly restricted and may be, for example, at least 0.1 millimole/liter, preferably at least 1 millimole/liter. The solvents used to dissolve the electrolyte may be used singly or in combination The temperature at which the electrode having a coating of the polymeric electrochromic material is used is not particularly limited. Preferably it is from 5° C. above the freezing point of the solvent used in the electrolyte solution to 5° C. below the boiling point, preferably from 10° C. above the freezing point to 10° C. below the boiling point.

There is no limitation on the operating voltage for coloring the polymeric electrochromic material of this invention, but for example, it is preferably not more than 15 V, preferably not more than 5 V. To decolor the colored electrochromic material, a voltage of an opposite polarity may be applied. For example, it is preferably not more than 15 V, more preferably not more than 5 V. The decolored polymeric electrochromic material reversibly changes in color by repeating the foregoing procedure of coloration and decoloration.

According to this invention, there is provided an electrochromic display element (ECD element) comprising a pair of display electrodes each comprising a conductive transparent substrate and a conductive coating with an electrolytic medium disposed therebetween, one of the display electrode having a coloration layer composed of the electrochromic material described above as the conductive coating, and the other having a coloration layer composed of a transition metal oxide or a resin composition containing a viologen as the conductive coating.

In the electrochromic display of this invention, one of the display electrodes (to be referred to as the display electrode A) is an electrode having the electrochromic material of this invention.

The other display electrode (which may be referred to as the display electrode B) is an electrode composed of a conductive transparent substrate and a coloration layer composed of a transition metal oxide or a resin composition containing a viologen as a conductive coating. The viologen is a quaternization product of 4,4'-dipyridyl, and includes, for example, lower viologens of the following formula (V)

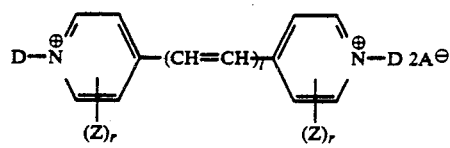

wherein D represents a monovalent hydrocarbon group, Z represents an alkyl group having 1 to 3 carbon atoms, l is 0 or 1, r is 0, 1 or 2 and $A^{\ominus}$ represents an inorganic or organic monovalent anion, and viologen polymers having recurring units of the following formula (VI) or (VII)

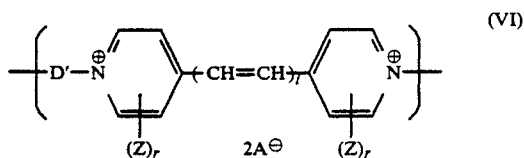

wherein D' represents a divalent hydrocarbon group, and Z, l, r or $A^{\ominus}$ are as defined with regard to formula (V)

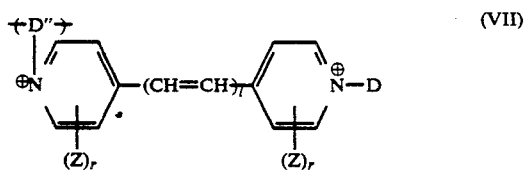

wherein D" represents a trivalent hydrocarbon group, and Z, l and r are as defined with regard to formula (V).

In formulae (V) and (VI), A may also be an anion in a polyanion of polystyrene sulfonate, for example.

The display electrode B is obtained by blending the viologen with another resin, and coating the mixture on a conductive transparent substrate.

Examples of resin compositions containing the viologen are compositions obtained by reacting an epoxy resin or a cyclic iminoether with a compound selected from the group consisting of polycarboxylic acids, polyhydroxy compounds and polyamine compounds other than 4,4'-diaminodiphenylmethane derivatives in the presence of a catalyst under heat and incorporating the viologen into the resulting resin; and resins obtained by reacting a cyclic iminoether, 4,4'-dipyridyl, and as required at least one compound selected from the group consisting of polycarboxylic acids, polyhydroxy compounds and polyamine compounds other than 4,4'-diaminodiphenylmethane derivatives. The cyclic iminoethers, polycarboxylic acids, polyhydroxy compounds and polyamine compounds other than 4,4'-diaminodiphenylmethane may be the same as those described hereinabove with regard to the cured resin composition of the invention. In the case of the latter resins, the reaction of the cyclic iminoether with 4,4'-dipyridyl forms a viologen structure. The amount of 4,4'-dipyridyl used at this time is preferably 0.01 to 70 mole %, more preferably 0.05 to 60 mole %, especially preferably 0.1 to 50 mole %, based on the cyclic iminoether. When at least one compound selected from the group consisting of polycarboxylic acids, polyhydroxy compounds and polyamine compounds other than 4,4'-diaminodiphenylmethane is used in combination, the total amount of 4,4'-dipyridyl and the other components is preferably 10 to 120 mole %, more preferably 20 to 110 mole %, especially preferably 30 to 100 mole %, based on the cyclic iminoether. The reaction conditions that can be used may be the various conditions described hereinabove.

Examples of the transition metal oxide are tungsten oxide, molybdenum oxide and vanadium oxide. Tungsten oxide is especially preferred from the standpoint of low voltage coloration characteristics and chemical stability. The coloration layer may be formed on the conductive transparent substrate by using a physical deposition method such as vacuum evaporation and sputtering. The resulting coating has a film thickness of usually 500 to 10,000 angstrom, preferably 1,000 to 5,000 angstrom. Since the ECD phenomenon of the thin coating is observed in the crystalline state, it is necessary to form the coating while keeping the substrate at not more than 200° C.

The display electrode B colors by using it as a cathode and applying a voltage to it, and decolors by using it as an anode and applying a voltage to it. The ECD element of this invention is constructed by arranging the display electrodes A and B with an electrolyte medium therebetween. There is no particular limitation on the electrolyte medium, and may be any liquid or solid electrolyte medium known in the art. Examples of electrolytes which form liquid electrolyte media include inorganic electrolytes such as alkali metal salts of halogens or halogen peroxides; and organic electrolytes such as cetyl trimethyl ammonium chloride, cetyl trimethyl ammonium bromide and tetrabutyl ammonium perchlorate.

These liquid electrolyte media may be prepared by dissolving the electrolytes in liquid media, for example water or an organic solvent such as acetonitrile, propylene carbonate, dimethylformamide, N-methyl-2-pyrrolidone and dimethyl sulfoxide.

Examples of the solid electrolyte medium are known polymeric electrolytes such as polyethylene oxide, polyphosphagen and polyethylenimine into which alkali metal salts are introduced.

The EDC element including an electrode having a coloration layer composed of a transition metal oxide as the display electrode B has excellent repeating characteristics because it has a combination of electrodes whose surfaces are modified by a substance having excellent characteristics of reversing between electrolytic oxidation and reduction.

In the ECD element of this invention having the above structure, both electrodes act as display electrodes while in a conventional element one electrode (counterelectrode) does not directly contribute to coloration. If voltages are applied so that the display electrode A becomes an anode, and the display electrode B becomes a cathode, both electrodes color. If conversely, voltages are applied so that the display electrode A becomes a cathode and the display electrode B becomes an anode, both electrodes decolor. Accordingly, in spite of the fact that the power consumption of the element of this invention is nearly the same as that of the conventional element, the coloration is very brilliant, and there is a large contrast between the coloration and the decoloration. Furthermore, since the resin used to modify the display electrode A has very good solvent resistance and thermal stability, the ECD element of this invention has good durability and very great industrial significance.

The present inventors have also found that the above electrochromic material, that is, the crosslinked polymer having the bonded units represented by formula (I) with the amino groups in the bonded units being quaternized, have very favorable properties as a photochromic material.

Thus, the invention provides a method of repeated coloration by photochromism, which comprises (1) preparing an article of a crosslinked polymer having the bonded units of formula (I) with the amino groups therein being quaternized, (2) irradiating ultraviolet light to the article to color part or the whole of the article by photochromism, (3) heating the colored article or irradiating laser light to the colored article to decolor part or the whole of the colored portion of the article, and (4) repeating steps (2) and (3) by using the article obtained in step (3) as the article of step (2).

No method had previously been known which repeats coloration and decoloration on the above crosslinked polymer.

In step (1) of the above method, an article of the crosslinked polymer in accordance with this invention is prepared. The article may be, for example, a display material, or a recording material or element.

In step (2), ultraviolet light is irradiated onto the article to color it. Irradiation of ultraviolet light may be directed to the whole or part of the article, and only the irradiated portion is colored.

The irradiation temperature is not particularly limited. For example, it is preferably not more than $(Tg-10)$° C., more preferably not more than $(Tg-20)$° C., especially preferably not more than $(Tg-30)$° C. Tg is the glass transition temperature of the crosslinked resin composition to be defined below.

The irradiation time may be one required for the coloration to proceed sufficiently. It differs depending upon the composition of the resin, and the shape of the molded article, etc., is preferably not more than 1 hour, more preferably 0.1 second to 30 minutes, especially preferably 1 second to 2 seconds. By the above irradiation, a colorless to yellow resin can be colored blue to green, for example. By irradiating ultraviolet to localized areas of the resin, or masking part of the resin, it can be colored partially. The green to blue color is very stable, and at ordinary temperatures (for example, 40° C. or below), does not substantially fade nor decolor.

In step (3) of the above process, laser light is irradiated on the article colored in step (2) to cause decoloration of the colored portions of the article wholly or partly.

For example, by heat-treating the resin article colored green or blue in step (2) at a temperature of at least $(Tg-50)$° C., the green to blue color of the resin can be used to disappear. Tg, herein, denotes the glass transition of the resin measured at a temperature elevating rate of 10° C./min. by using a thermomechanical property measuring device. At temperatures below $(Tg-50)$° C., a very long period of time is necessary for decoloration. The preferred heat-treatment temperature is at least $(Tg-40)$° C., especially at least $(Tg-30)$° C./min. The heat-treatment time is one which enables the decoloration of the resin to proceed sufficiently, and varies depending upon the composition of the resin, the shape of the article and the heat-treatment temperature, but is preferably not more than 10 minutes, more preferably 0.1 second 5 minutes, especially preferably 0.5 to 1 minute.

The heat-treatment may be performed by hot air heating, steam heating, hot solvent heating, infrared heating, etc. The above heat-treatment causes decoloration of the green to blue color, and the resin article becomes colorless or yellow. By localized heating, the resin article can also be partly decolored.

The wavelength of the laser light used in step (2) to decolor the colored resin article may desirably be near the peak wavelength of the colored resin, specifically 400 to 800 nm, especially preferably 550 to 750 nm. There is no particular restriction on the irradiation time, and may be one which enables the decoloration of the resin to proceed sufficiently. It may vary depending upon the composition of the resin, the shape of the resin article and the wavelength of the laser light, and is preferably not more than 30 minutes, more preferably $10^{-4}$ second to 20 minutes, especially preferably $10^{-3}$ second to 10 minutes. The intensity of the laser light differs depending upon the composition and shape of the resin article, but may be one which enables the decoloration of the resin to proceed sufficiently. For example, it is preferably at least 1 W/cm$^2$, more preferably at least 10 W/cm$^2$.

According to the above method, steps (2) and (3) are repeatedly carried out. The coloration and decoloration of the resin can be repeated by utilizing the photochromism of the crosslinked resin in accordance with this invention.

The decoloration and coloration are reversible, and can be repeatedly carried out. The durability of the resin article used in the above method is very high. Much is still unknown on the mechanism of decoloration by heat-treatment and laser light irradiation and coloration by ultraviolet irradiation, but it is presumably due to the structure formed by the curing of the resin. At any rate, the repetition of coloration and decoloration is not due to the photochromic or thermochromic low-molecular-weight compound, but to the function of the thermoset resin itself. The novel photochromic and thermochromic material provided by this invention, in spite of its being a thermoset resin, requires only very short period of time for decoloration and coloration, and can be advantageously used as a novel display material, recording material or element. The industrial significance of the present invention is very great.

The following examples illustrate the present invention. All parts in these examples are by weight.

EXAMPLES 1–13

31.2 Parts of 2,2'-m-phenylenebis(2-oxazoline), 20 parts of 4,4'-diaminodiphenylmethane, 14 parts of ethyl p-toluenesulfonate and each of the electrolytes shown in Table 1 in the amount indicated were dissolved in 75 parts of chloroform. The solution was cast on a conductive film and heated to 100° C. to remove chloroform. When the solution on the film was further heated at 150° C. for 3 minutes, it cured. The resulting polymeric electrochromic electrode and a conductive film as a counterelectrode were immersed in each of the electrolyte solutions indicated in Table 1, and the polymeric electrochromic electrode was connected to the positive electrode of a cell, and the untreated conductive film (counterelectrode), to its negative electrode. When a voltage of 1.5 to 3 V was applied, the colorless to pale yellow positive electrode turned blue or green. When the polarity of the the cell to which it was connected was reversed, it regained the original color. The electrode changed reversibly in color by repeating the above coloration and decoloration operation.

TABLE 1

| Example | Electrochromic electrode Electrolyte | Part | Electrolyte solution Electrolyte | Part | Solvent/ 80 ml | Temperature (°C.) |
|---|---|---|---|---|---|---|
| 1 | CTAC *1 | 15.0 | CTAC | 25.0 | acetonitrile | 70 |
| 2 | CTAB *2 | 17.1 | CTAC | 25.0 | acetonitrile | 70 |
| 3 | TBAP *3 | 16.0 | CTAC | 25.0 | acetonitrile | 70 |
| 4 | TBABr *4 | 15.1 | CTAC | 25.0 | acetonitrile | 70 |
| 5 | TBAP | 16.0 | CTAB | 28.0 | acetonitrile | 70 |
| 6 | TBAP | 16.0 | TBAP | 27.0 | acetonitrile | 70 |
| 7 | TBAP | 16.0 | TBABr | 25.0 | acetonitrile | 70 |
| 8 | CTAC | 15.0 | CTAC | 25.0 | ethylene glycol | 70 |
| 9 | CTAC | 15.0 | CTAC | 25.0 | sulfolane | 70 |
| 10 | CTAC | 15.0 | CTAC | 25.0 | DMAC | 70 |
| 11 | CTAC | 15.0 | CTAC | 25.0 | water | 70 |
| 12 | CTAC | 15.0 | CTAC | 25.0 | NMP | 70 |
| 13 | CTAC | 15.0 | CTAC | 25.0 | acetonitrile | 20 |

*1 cetyl trimethyl ammonium chloride
*2 cetyl trimethyl ammonium bromide
*3 tetra-n-butyl ammonium perchlorate
*4 tetra-n-butyl ammonium bromide

EXAMPLES 14–16

312 Parts of 2,2'-m-phenylenebis(2-oxazoline), each of the diamino compounds shown in Table 2 in the amount indicated, 5.5 parts of ethyl p-toluenesulfonate, 160 parts of TBAP and 400 parts of each of the additives shown in Table 2 were put in a glass reactor, and completely dissolved at 80° C. A portion of the solution was cast on a conductive film and heated at 150° C. for 3 minutes to form a cured coating. When a voltage was applied in the same way as in Examples 1 to 13, the resulting polymeric electrochromic electrode reversibly repeated coloration and decoloration.

TABLE 2

| Example | Electrochromic electrode Diamino compound | Part | Additive | Electrolyte solution Electrolyte | Part | Solvent |
|---|---|---|---|---|---|---|
| 14 | N,N'-dimethyl-4,4'-diaminodiphenylmethane | 226 | sulfolane | CTAC | 25.0 | acetonitrile |
| 15 | N,N'-diethyl-4,4' diaminodiphenylmethane | 250 | N-methylpyrrolidone | CTAC | 25.0 | acetonitrile |
| 16 | N,N'-diethyl-4,4'-diaminodiphenylmethane | 250 | ethylene glycol | CTAC | 25.0 | acetonitrile |

EXAMPLE 17

312 Parts of 2,2'-m-phenylenebis(2-oxazoline), 25 parts of N,N'-dibenzyl-4,4'-diaminodiphenylmethane, 127 parts of adipic acid, 14 parts of ethyl p-toluenesulfonate, 150 parts of TBAP and 400 parts of dimethylacetamide were completely dissolved at 80° C. A portion of the solution was cast on a conductive film, and heated at 160° C. for 3 minutes to form a cured coating. The resulting polymeric electrochromic electrode and a conductive film were immersed in 80 ml of acetonitrile dissolving 25 parts of TBAP, and a voltage was applied as in Examples 1 to 13. It reversibly repeated coloration and decoloration.

EXAMPLE 18

312 parts of 2,2'-m-phenylenebis(2-oxazoline), 20 parts of 4,4'-diaminodiphenylmethane, 140 parts of cyclohexane dimethanol, 12.4 parts of p-toluenesulfonic acid, 140 parts of TBABr and 200 parts of methanol were put in a glass reactor and completely dissolved.

A portion of the solution was cast on a conductive film, and methanol was removed at 100° C. Then, the wet coating was heated at 160° C. for 30 minutes to form a cured coating. When a voltage was applied as in Example 17, the polymeric electrochromic electrode reversibly repeated coloration and decoloration.

EXAMPLE 19

352 Parts of 2,2'-m-phenylenebis(5,6-dihydro-4H-1,3-oxazine), 200 parts of 4,4'-diaminodiphenylmethane, 50 parts of bis(3,5-dibromo-4-hydroxyphenyl)sulfone, 150 parts of TBAP were put in a glass reactor and completely dissolved at 130° C. The solution was cast on a conductive film and heated at 160° C. for 15 minutes to form a cured coating. When a voltage was applied to the resulting polymeric electrochromic electrode by the same method as in Example 17, it repeated coloration and decoloration.

EXAMPLE 20

312 Parts of 2,2'-m-phenylenebis(2-oxazoline), 30 parts of 4,4'-diaminodiphenylmethane, 288 parts of 3,3'-diaminodiphenylsulfone, 20 parts of n-butyl iodide, 150 parts of TBAP and 200 parts of methanol were put in a glass reactor and completely dissolved. The resulting solution was cast on a conductive film, and heated at 160° C. for 5 minutes to form a cured coating.

When a voltage was applied by the same method as in Example 17, the polymeric electrochromic electrode reversibly repeated coloration and decoloration.

EXAMPLE 21

2.5 parts of 3,3'-diaminodiphenylsulfone, 4.6 parts of bis[4-N,N-di(2,3-epoxypropyl)aminophenyl]methane, 4 parts of ethyl p-toluenesulfonate and 3 parts of tetrabutyl ammonium perchlorate were well dissolved in 50 parts of 1,1,2,2-tetrachloroethane and the solution was cast on a transparent plate.

When the transparent electrode was heated at 180° C. for 1 hour in an atmosphere of nitrogen, the coated resin was cured. The resulting transparent electrode was used as an operating electrode and a platinum electrode was used as a counterelectrode, and they were immersed in an electrolyte solution prepared by dissolving 30 parts of tetrabutyl ammonium perchlorate in 1000 parts of methanol. When a voltage of 2.0 V was applied by using the operating electrode as an anode, the transparent operating electrode immediately turned blue. When the direction of applying a voltage was reversed, the colored electrode rapidly decolored. By repeating the coloration and decoloration operation repeatedly, the color of the electrode changed reversibly.

EXAMPLE 22

3.4 Parts of methylcyclohexane-1,2-dicarboxylic anhydride, 2.5 parts of bis[4-N,N-di(2,3-epoxypropyl)aminophenyl]methane, 0.1 part of N,N-dimethylbenzylamine and 3 parts of TBAP were dissolved in 10 parts of 1,1,2,2-tetrachloroethane. The solution was cast on a transparent electrode, and heated at 180° C. for 40 minutes in an atmosphere of nitrogen to form a cured coating.

The polymeric cast electrode was then immersed in ethyl iodide and heated for 2 hours under reflux. It was then taken out and used as an operating electrode. The resulting operating electrode and a platinum electrode as a counterelectrode were immersed in a solution of 30 parts of tetrabutyl ammonium perchlorate in 1000 parts of methanol. When a voltage of 2.0 V was applied to the operating electrode as an anode, the transparent operating electrode immediately turned blue. Then, when the direction of applying the voltage was reversed, it rapidly decolored. By repeating the above coloration and decoloration operations, the electrode reversibly changed in color.

EXAMPLE 23

1.0 Part of 4,4'-diaminodiphenylmethane, 3.4 parts of a bisphenol A-type epoxy compound having an epoxy equivalent of 195 g/eq. and 1.0 part of tetrabutyl ammonium perchlorate were dissolved in 40 parts of 1,1,2,2-tetrachloroethane. The solution was cast on a transparent electrode and when it was heated at 180° C. for 1 hour in an atmosphere of nitrogen, it cured. The resulting operating electrode and a platinum electrode as a counterelectrode were immersed in a solution of 30 parts of tetrabutyl ammonium perchlorate in 1000 parts of N,N-dimethylacetamide. When a voltage of 2.0 V was applied to the operating electrode as an anode, the pale yellow operating electrode immediately turned blue. When the direction of applying the voltage was reversed, it rapidly decolored. By repeating the above coloration and decoloration operations, the electrode reversibly changed in color.

EXAMPLE 24

2.0 Parts of 4,4'-diaminodiphenylmethane, 3.6 g of a phenol novolak-type epoxy compound having an epoxy equivalent of 180 g/eq. and 3.0 parts of tetrabutyl ammonium perchlorate were dissolved in 40 parts of 1,1,2,2-tetrachloroethane, and the solution was cast on a transparent electrode. When it was heated at 200° C. for 45 minutes in an atmosphere of nitrogen, it cured. The resulting operating electrode and a platinum electrode (counterelectrode) were immersed in a solution of 3.0 parts of tetrabutyl ammonium perchlorate in 100 parts of methanol. When a voltage was applied as in Example 21, the operating electrode turned blue. When the direction of applying the voltage was reversed, it rapidly decolored. The electrode reversibly changed in color by repeating the above coloration and decoloration operations.

EXAMPLE 25

1.0 Part of 4,4'-diaminodiphenylmethane, 0.8 part of 4,4'-diaminodiphenylsulfone, 3.6 g of a phenol novolak-type epoxy compound having an epoxy equivalent of 180 g/eq. and 3.0 parts of tetrabutyl ammonium perchlorate were dissolved in 50 parts of 1,1,2,2-tetrachloroethane. The resulting solution was cast as in Example 22 to prepare an operating electrode. When a voltage was applied by the same method as in Example 21, the operating electrode immediately turned blue. When the direction of applying the voltage was reversed, it rapidly decolored. The electrode reversibly changed in color by repeating the above coloration and decoloration operations.

EXAMPLE 26

2.7 Parts of bis(3-chloro-4-aminophenyl)methane, 4.3 parts of 2,2'-m-phenylenebis(2-oxazoline), 4.0 parts of p-toluenesulfonic acid and 4.0 parts of tetra-n-butyl ammonium perchlorate were dissolved in 50 parts of 1,1,2,2-tetrachloroethane. The solution was reacted at 110° C. for 10 minutes in an atmosphere of nitrogen, cooled and then cast on a transparent electrode. When the transparent electrode was heated at 150° C. for 30 minutes, there was obtained a transparent electrode having a resin film on its surface. The resulting operating electrode and a platinum electrode as a counterelectrode were immersed in a solution of 3.0 parts of tetrabutyl ammonium perchlorate in 100 parts of methanol. When a voltage of 1.5 V was applied to the operating electrode as an anode, the transparent operating electrode immediately turned violet. When the direction of applying the voltage was reversed, it rapidly decolored. By repeating the above coloration and decoloration operations, the electrode reversibly changed in color.

EXAMPLE 27

2.3 Parts of bis(2-methyl-4-aminophenyl)methane, 4.3 parts of 2,2'-m-phenylenebis(2-oxazoline), 4.0 parts of p-toluenesulfonic acid and 4.0 parts of tetra-n-butyl ammonium perchlorate were dissolved in 50 parts of 1,1,2,2-tetrachloroethane. The solution was reacted at 100° C. for 10 minutes, cooled, and cast on a transparent electrode. When the transparent electrode was heated at 150° C. for 20 minutes, a transparent plate having a resin film on its surface was obtained. The resulting operating electrode and a platinum electrode as a counterelectrode were immersed in a solution of 3.0 parts of tetrabutyl ammonium perchlorate in 100 parts of methanol. When a voltage of 1.5 V was applied to the operating electrode as an anode, the operating electrode immediately turned blue. When the direction of applying the voltage was reversed, it rapidly decolored. The electrode reversibly changed in color by repeating the above coloration and decoloration operations.

EXAMPLE 28

The bis(4-aminophenyl)methane derivative, the reactant and the electrolyte shown in Table 3 were dissolved in dioxane and the solution was heated at 100° C. for 1.5 hours. A portion of the solution was placed on NESA glass and spin-coated. The coating was heated to 100° C. to remove dioxane, and then heated at 150° C. for 5 minutes to form a cured coating.

The coated NESA glass was immersed for 15 minutes in iodoethane under reflux to form an operating electrode.

The operating electrode and NESA glass (counterelectrode) were immersed in a stream of nitrogen in a solution of tetra-n-butyl ammonium perchlorate in the amount indicated in Table 3 in dehydrated and deoxygenated methanol. The operating electrode was used as an anode, and the counterelectrode as a cathode, and a voltage of 1.5 V was applied. The anode which was originally pale yellow turned blue green. When the direction of applying the voltage was reversed, it rapidly decolored. The electrode reversibly changed in color by repeating the above coloration and decoloration operations.

EXAMPLES 29-31

The bis(4-aminophenyl)methane derivative, the reactant, the electrolyte and alkyl p-toluenesulfonate indicated in Table 3 were dissolved in each of the solvents shown in Table 3, and the solution was heated at 100° C. for 1.5 hours. Then, a portion of the solution was placed on NESA glass and spin-coated, and then heated at 150° C. (Example 29) or 100° C. (Examples 30 and 31) to remove the solvent. Then the coating was heated at 150° C. for 5 minutes to form a cured electrode.

The resulting operating electrode and NESA glass (counterelectrode) were combined, and immersed in an electrolyte solution prepared by dissolving each of the electrolytes indicated in Table 3 in each of the dehydrated and deoxygenated solvents indicated in Table 3, and a voltage was applied by the same method as in Example 28. The operating electrode turned blue or green from colorless or yellow, and changed reversibly in color.

TABLE 3

| Example | Polymer electrode | | | | | Electrolyte solution | | Coloration upon application of a voltage |
|---|---|---|---|---|---|---|---|---|
| | MDA deriv. *1 | Reactant | Electrolyte | Solvent | Quaternization treatment | Electrolyte | Solvent | |
| 28 | TGMDA *2 (15) | adipic acid (10.4) | TBABF$_4$ *4 (11) | dioxane (75) | iodoethane | TBAP (3.4) | methanol (80) | yes |
| 29 | TGMDA *2 (15) | 2,2'-m-phenylenebis-(2-oxazoline) (15.4) | TBAP *5 (17.2) | 1,1,2,2-tetra-chloro-ethane (70) | methyl p-toluene sulfonate (1.5) | CTAC *6 (3.2) | CH$_3$CN (80) | yes |
| 30 | TGMDA *2 (15) | hexa-methylene diamine (4) | TBAP *5 (6) | dioxane (75) | methyl p-(0.8) | TMAP *7 (1.7) | methanol (80) | yes |
| 31 | DGDMMDA *3 (15) | hexa-methylene diamine | TBABF$_4$ *4 (8) | dioxane (75) | ethyl p-toluene sulfonate | TBAP (3.4) | ethanol (80) | yes |

TABLE 3-continued

| | Polymer electrode | | | | Electrolyte solution | | Coloration upon application of a voltage |
|---|---|---|---|---|---|---|---|
| Example | MDA deriv. *1 | Reactant | Electrolyte | Solvent | Quaternization treatment | Electrolyte | Solvent | |
| | | | (2.6) | | (0.08) | | | |

The figures in the parentheses show the amounts in parts by weight.
*1 bis(4-aminophenyl)methane
*2 bis[4-N,N-di(2,3-epoxypropyl)aminophenyl]methane
*3 bis[4-N-(2,3-epoxypropyl)-N-methylaminophenyl]methane
*4 tetra-n-butyl ammonium tetrafluoroborate
*5 tetra-n-butyl ammonium perchlorate
*6 cetyl trimethyl ammonium chloride
*7 tetramethyl ammonium perchlorate

EXAMPLE 32

31.2 Parts of 2,2'-m-phenylenebis((2-oxazoline), 20.0 parts of 4,4'-diaminodiphenylmethane, 14.0 parts of ethyl p-toluenesulfonate and 15.0 parts of tetra-n-butyl ammonium perchlorate were dissolved in 1500 parts of chloroform. A portion of the solution was cast on NESA glass, heated to 100° C. to remove chloroform, and heated at 150° C. for 3 minutes to form a cured coating and prepare a display electrode A.

Separately, 31.2 parts of 2,2'-m-phenylenebis(2-oxazoline), 11.7 parts of sebacic acid, 16.2 parts of p-toluenesulfonic acid, 15.8 parts of cetyl trimethyl ammonium chloride and 6.8 parts of 4,4'-dipyridyl were dissolved in 800 parts of methanol. The solution was cast on NESA glass, heated to 100° C. to remove methanol, and then heated at 170° C. for 30 minutes to form a cured coating and prepare a display electrode B.

The display electrodes A and B were immersed in a solution of 320 parts of cetyl trimethyl ammonium chloride in 7,900 parts of deoxygenated acetonitrile. When a voltage of 1.5 V was applied to the display electrode A as an anode and the display electrode B as an cathode, the anode changed from colorless to pale yellow color to blue or green, and the cathode changed from colorless to reddish violet.

When the polarity of the voltage was reversed, both electrodes rapidly decolored.

The electrodes reversely changed in color when the above coloration and decoloration operations were repeated.

EXAMPLE 33

2.5 Parts of 3,3'-diaminodiphenylsulfone, 4.6 parts of bis[4-N,N-di(2,3-epoxypropyl)aminophenyl]methane, 4 parts of ethyl p-toluenesulfonate and 3 parts of tetrabutyl ammonium perchlorate were well dissolved in 50 parts of 1,1,2,2-tetrachloroethane, and the solution was cast on a transparent electrode.

When this transparent electrode was heated at 180° C. for 1 hour in an atmosphere of nitrogen, the coated resin cured (the resulting coated transparent electrode is designated as display electrode A).

Separately, 31.2 parts of 2,2'-m-phenylenebis(2-oxazoline), 4.5 parts of ethylene glycol, 12 parts of n-butyl iodide, 17.1 parts of cetyl trimethyl ammonium bromide and 4.5 parts of 4,4'-dipyridyl were dissolved in 1,500 parts of chloroform.

A portion of the resulting solution was uniformly coated on NESA glass, heated to 80° C. to remove chloroform, and heated at 160° C. for 15 minutes to cure the resin (the resulting electrode is designated as display electrode B).

The display electrodes A and B were immersed in a solution of 322 parts of cetyl trimethyl ammonium chloride in 7,900 parts of acetonitrile, and a voltage was applied by the same operation as in Example 32. The anode turned from colorless to pale yellow to blue or pale green, and the cathode turned from colorless to reddish violet. When the polarity of the voltage applied was reversed, the electrodes regained the original colors. The coloration and decoloration were repeated reversibly.

EXAMPLE 34

2.7 Parts of bis(3-chloro-4-aminophenyl)methane, 4.3 parts of 2,2'-m-phenylenebis(2-oxazoline), 4.0 parts of p-toluenesulfonic acid and 4.0 parts of tetra-n-butyl ammonium perchlorate were dissolved in 50 parts of 1,1,2,2-tetrachloroethane. The solution was reacted at 110° C. for 10 minutes in an atmosphere of nitrogen and then cooled, and cast on a transparent glass electrode. When the transparent electrode was heated at 150° C. for 30 minutes, a transparent electrode having a resin film on its surface (display electrode A) was obtained.

Separately, 35 parts of 2,2'-m-phenylenebis(5,6-dihydro-4H-1,3-oxazine), 11.7 parts of m-xylylenediamine, 6.1 parts of ethyl benzenesulfonate, 15.1 parts of tetra-n-butyl ammonium perchlorate and 2.3 parts of 4,4'-dipyridyl were dissolved in 1,400 parts of chloroform. A portion of the resulting solution was cast on a transparent conductive film, heated to 100° C. to remove the solvent, and then heated at 165° C. for 30 minutes to cure the resin (the resulting coated electrode is designated as display electrode B).

The two electrodes were immersed in a solution of 330 parts of tetra-n-butyl ammonium perchlorate in 6,500 parts of acetonitrile, and a voltage was applied as in Example 32. The electrodes repeated reversible color changes.

EXAMPLE 35

2.0 Parts of 4,4'-diaminodiphenylmethane, 3.6 g of a phenol novolak-type epoxy compound having an epoxy equivalent of 180 g/eq. and 3.0 parts of tetrabutyl ammonium perchlorate were dissolved in 40 parts of 1,1,2,2-chloroethane. The solution was cast on a transparent glass electrode, and heated at 200° C. for 45 minutes in an atmosphere of nitrogen to cure the resin (the resulting electrode is designated as display electrode A).

31.2 Parts of 2,2'-m-phenylenebis(oxazoline), 12.6 parts of adipic acid, 0.7 part of p-toluenesulfonic acid, 16.1 parts of tetra-n-butyl ammonium perchlorate and 3 parts of N,N'-dimethyl-4,4'-dipyridinium dibromide were dissolved in 1,000 parts of methanol. Then, a portion of the solution was cast on NESA glass, heated to 100° C. to remove methanol, and then left to stand at 165° C. for 30 minutes to cure the coating. The resulting coated electrode is designated as display electrode B.

The display electrodes A and B were immersed in a solution of 300 parts of tetra-n-butyl ammonium bromide in 1,000 parts of methanol, and a voltage was applied by the same operation as in Example 32. The colorless transparent display electrodes A and B simultaneously turned blue. When the direction of applying the voltage was reversed, the electrodes rapidly decolored and became colorless and transparent.

The electrodes reversibly changed in color by repeating the above coloration and decoloration operations.

EXAMPLE 36

1.0 Part of 4,4'-diaminodiphenylmethane, 3.4 parts of a bisphenol A-type epoxy compound having an epoxy equivalent of 195 g/eq. and 1.0 part of tetrabutyl ammonium perchlorate were dissolved in 40 parts of 1,1,2,2-tetrachloroethane. The resulting solution was cast on a transparent glass electrode, and heated at 180° C. for 1 hour in an atmosphere of nitrogen (the resulting coated electrode is designated as display electrode A).

The same display electrode B as used in Example 32 was used, and a voltage was applied by the same operation as in Example 32. When the display electrode A was made an anode, and the display electrode B, a cathode, the electrodes were colored. When the direction applying the voltage was reversed, they rapidly colored. By repeating these operations, the two electrodes reversibly changed in color.

EXAMPLE 37

31.2 Parts of 2,2'-m-phenylenebis(2-oxazoline), 2.5 parts of N,N'-dibenzyl-4,4'-diaminodiphenylmethane, 12.7 parts of adipic acid, 1 part of benzenesulfonic acid and 15.0 parts of cetyl trimethyl ammonium chloride were dissolved in 800 parts of methanol. Then, a portion of the resulting solution was uniformly coated on NESA glass by a bar coater, heated to 100° C. to remove methanol, and then heated at 160° C. for 5 minutes to cure the coating (the resulting coated electrode is designated display electrode A).

Separately, 31.2 parts of 2,2,-m-phenylenebis(2-oxazoline), 4.5 parts of ethylene glycol, 12 parts of n-butyl iodide, 17.1 parts of cetyl trimethyl ammonium chloride and 4.5 parts of 4,4'-dipyridyl were dissolved in 1,500 parts of chloroform. Then, the resulting solution was cast on NESA glass, heated to 100° C. to remove methanol, and then heated at 170° C. for 30 minutes to cure the coating (the resulting coated electrode is designated as a display electrode B).

The display electrodes A and B were immersed in a solution of 322 parts of cetyl trimethyl ammonium chloride in 7,900 parts of acetonitrile, and when a voltage was applied by the same operation as in Example 32, the anode changed from a colorless to pale yellow color to a blue or pale green color, and the cathode changed from colorless to a reddish violet color. When the direction of applying the voltage was reversed, the electrodes were decolored. By repeating the above operations, the electrodes changed reversibly in color.

EXAMPLE 38

31.2 Parts of 2,2'-m-phenylenebis(2-oxazoline), 2.3 parts of N,N'-dimethyl-4,4'-diaminodiphenylmethane, 14.0 parts of 1,4-cyclohexnedimethanol, 3.0 parts of bis(3,5-dibromo-4-hydroxyphenyl)sulfone and 17.1 parts of cetyl trimethylammonium bromide were put in a glass reactor, and after purging with nitrogen, heated to 140° C. to form a solution. A portion of the resulting solution was placed on a transparent conductive film, roller-coated while being heated on a hot plate kept at 180° C., and then left to stand in this state for 10 minutes (the resulting coated electrode is designated as display electrode A).

Separately, 35 parts of 2,2'-m-phenylenebis(5,6-dihydro-4H-1,3-oxazine), 11.7 parts of m-xylylenediamine, 6.1 parts of ethyl benzenesulfonate, 15.1 parts of tetra-n-butyl ammonium bromide, 2.3 parts of 4,4'-dipyridyl were dissolved in 1,400 parts of chloroform. A portion of the resulting solution was cast on a transparent conductive film, heated to 100° C. to remove the solvent, and heated at 165° C. for 30 minutes to cure the coating (the resulting coated electrode is designated as display electrode B).

The two electrodes were immersed in a solution of 330 parts of tetra-n-butyl ammonium perchlorate in 6,500 parts of acetonitrile, and a voltage was applied as in Example 32. The electrodes reversibly changed in color.

EXAMPLE 39

35.2 Parts of 2,2'-m-phenylenebis(5,6-dihydro-4H-1,3-oxazine), 1 part of N,N'-diethyl-4,4'-diaminodiphenylmethane, 25.0 parts of 3,3'-diaminodiphenylsulfone, 2 parts of n-butyl iodide and 15.1 parts of tetra-n-butyl ammonium bromide were dissolved in 1,500 parts of 1,1,2,2-tetrachloroethane. The solution was heated at 120° C. for 20 minutes under nitrogen with stirring. The solution changed to a viscous liquid. A portion of the liquid was placed on NESA glass, uniformly coated by a spin coating method, and heated at 160° C. for 5 minutes (the resulting coated electrode is designated as display electrode A).

31.2 Parts of 2,2'-m-phenylenebis(oxazoline), 12.6 parts of adipic acid, 0.7 part of p-toluenesulfonic acid, 16.1 parts of tetra-n-butyl ammonium perchlorate and 2 parts of N,N'-dimethyl-4,4'-dipyridinium dibromide were dissolved in 1,000 parts of methanol. Then, a portion of the resulting solution was cast on NESA glass, heated to 100° C. to remove methanol, and then left to stand at 165° C. for 30 minutes to cure the coating (the resulting coated electrode is designated as display electrode B).

The display electrodes A and B were immersed in a solution of 300 parts of tetra-n-butyl ammonium bromide in 1,000 parts of methanol, and a voltage was applied by the same operation as in Example 32. The colorless transparent display electrodes A and B simultaneously colored blue. When the direction of applying the voltage was reversed, they rapidly decolored to the original colorless transparent electrodes. The electrodes reversibly changed in color by repeating the above coloration and decoloration operation.

EXAMPLE 40

The same display electrode A as used in Example 32 was used.

Tungsten oxide pellets in an alumina-coated tungsten crucible was vacuum deposited on NESA glass so that the deposited film of tungsten oxide had a thickness of 500 angstrom (display electrode B).

The display electrodes A and B were immersed in a solution of 100 parts of sodium perchlorate in 7,900 parts of deoxygenated acetonitrile. A voltage of about 3 V was applied to display electrode A as an anode and display electrode B as a cathode. The anode changed from a colorless to pale yellow color to a blue or green color, and the cathode which was originally colorless turned blue.

When the polarity of the voltage applied was reversed, both electrodes rapidly decolored.

The electrodes reversibly changed in color by repeating the above coloration and decoloration operations.

EXAMPLE 41

The same display electrode A as used in Example 33 was used.

The display electrode A was combined with the same display electrode B as in Example 40, and a voltage was applied in the same way as in Example 40. Both electrodes turned blue when the electrode A was an anode and electrode B a cathode. When the voltage was applied in a reverse direction, both electrodes decolored. The coloration and decoloration could be repeated with good reproducibility.

EXAMPLE 42

The same display electrode as used in Example 36 was used.

The display electrode A and the same display electrode B as used in Example 40 were immersed in a solution of 30 parts of sodium perchlorate in 1,000 parts of N,N-dimethylacetamide. When a voltage of about 3 V was applied to the display electrode A as an anode and the display electrode B as a cathode, both electrodes A and B which were originally colorless turned blue to violet. When the polarity of the voltage applied was reversed, both electrodes rapidly decolored. When the above coloration and decoloration were repeated, the electrodes reversibly changed in color.

EXAMPLE 43

21.6 Parts of 2,2'-m-phenylenebis(2-oxazoline), 13.9 parts of 4,4'-diaminodiphenylmethane (sold by Tokyo Chemical Industry Co., Ltd.) and 3 parts of bis(3,5-dibromo-4-hydroxyphenyl)sulfone were mixed, and then dissolved at about 150° C. in a nitrogen stream. The solution was poured into a mold kept at 180° C. and cured for 30 minutes to obtain a pale yellow transparent molded article having a thickness of about 3 mm. Ultraviolet light was irradiated on the molded article at a temperature of about 15° C. for 30 seconds from a 100 W ultraviolet lamp (UM-102 made by Ushio Electrical Co., Ltd.) placed about 20 cm apart. The molded article turned transparent brilliant green. When the green-colored molded article was immersed in an oil bath at 200° C. for 30 seconds, it regained its original transparent pale yellow color. The glass transition temperature of the molded article was 190° C.

EXAMPLE 44

24.4 Parts of 2,2'-m-phenylenebis(2-oxazoline), 13.9 parts of 4,4'-diaminodiphenylmethane, and 1.2 parts of p-toluenesulfonic acid were well mixed, and dissolved in a stream of nitrogen at 100° C. The solution was poured into a mold at 160° C., and reacted for 25 minutes. The resulting resin was transparent and pale yellow, and had a Tg of 180° C. When the molded article was irradiated with ultraviolet light that 20° C. for 30 seconds by using an ultraviolet irradiating device, it turned transparent green. When it was immersed in an oil bath at 180° C. for 1.5 minutes, it regained its original pale yellow color.

EXAMPLE 45

24.4 Parts of 1,2'-m-phenylenebis(5-methyl-2-oxazoline), 14 parts of 4,4'-diaminophenylmethane and 2 parts of methyl p-toluenesulfonate were well mixed, and dissolved at 100° C. The solution was then cast on a glass plate at 100° C., and heat-cured for 15 minutes. The resulting resin was transparent and assumed a slight yellowish shade. When ultraviolet light was irradiated at 25° C. for 5 minutes by using the same ultraviolet light irradiating device as used in Example 43 while the resin was maintained adhering to the glass plate. It was colored transparent blue. When the product was heat-treated with hot air at 200° C. for 3 minutes, it changed to a resin which was transparent and slightly yellowish.

EXAMPLE 46

10 Parts of 2,2'-m-phenylenebis(2-oxazoline), 3.7 parts of adipic acid, 0.5 part of 4,4'-diaminodiphenylmethane and 0.5 part of butyl iodide were put in a glass reactor, and well mixed. Thereafter, the inside of the reactor was purged with nitrogen, and the mixture was heated to 200° C. In 5 minutes, a pale yellow cured resin was obtained. This resin had a Tg of 137° C. When the molded article was irradiated at about 15° C. for 1 minute by using the same ultraviolet irradiating device as used in Example 43 at a distance of about 20 cm, the molded article turned transparent green. When the colored molded article was immersed for 30 seconds in an oil bath at 160° C., it regained the original pale yellow color.

EXAMPLE 47

10 Parts of 2,2'-m-phenylenebis(5,6-dihydro-4H-1,3-oxazine), 1.2 parts of cyclohexane dimethanol, 3.2 parts of N,N'-dibenzyl-4,4'-methylenedianiline and 0.5 part of p-toluenesulfonic acid were completely dissolved in 50 parts of chloroform. 0.5 Part of the resulting solution was added dropwise to a hot plate kept at 170° C., and left to stand for 30 minutes to give a sheet-like resin. The resin had a Tg of 148° C. When the sheet-like resin was irradiated at about 15° C. for 3 minutes at a distance of about 20 cm by using the same ultraviolet irradiating device as used in Example 43, the molded article turned green. When the green resin was heated to 120° C., it again turned yellow. When it was again irradiated by an ultraviolet lamp by the same way, it turned green.

EXAMPLE 48

When 31.2 parts of 1,2-m-phenylenebis(2-oxazoline), 13.6 parts of m-xylylenediaminesulfone, 1 part of N,N'-dimethyl-4,4'-methylenedianiline and 1 part of bis(3,5-dibromo-4-hydroxyphenyl)sulfone were treated as in Example 47, a transparent pale yellow sheet-like resin was obtained. The resin had a Tg of 180° C. When the molded article was irradiated with ultraviolet light for 2 minutes at about 15° C. at a distance of about 20 cm by using the same ultraviolet irradiating device as used in Example 47, the molded article turned green. When the green resin was heated to 170° C., it again became pale yellow and transparent.

EXAMPLE 49

When 10 parts of 2,2'-m-phenylenebis(5,6-dihydro-4H-1,3-oxazine), 0.3 part of N,N'-dibenzyl-4,4'-methylenedianiline p-toluenesulfonic acid salt, 2.5 parts of ethylene glycol, and 0.5 part of ethyl p-toluenesulfonate were treated by the same method as in Example 47, a very pale yellow sheet-like resin was obtained. The resin had a Tg of 137° C. When the resin was irradiated with ultraviolet light at about 15° C. for 1 minute at a distance of about 20 cm by the same ultraviolet light irradiating device as used in Example 43, the molded article turned blue. When the colored resin was heated at 120° C. for 15 seconds, the glass plate became very pale yellow.

EXAMPLE 50

2.5 Parts of 3,3'-diaminodiphenylsulfone, 4.6 parts of bis[4-N,N-di(2,3-epoxypropyl)aminophenyl]methane solved in 50 parts of 1,1,2,2-tetrachloroethane, and the solution was cast on a glass sheet, and heated at 180° C. for 30 minutes in an atmosphere of nitrogen. The resulting resin was transparent.

When the transparent resin was irradiated for about 1 minute by using a 100 W UV lamp (UM102 made by Ushio Electrical Co., Ltd.), it colored transparent green. When the green transparent resin was heated at 240° C. for 2 minutes, it became colorless transparent. By the above ultraviolet irradiation and heating, the article could be colored and decolored.

EXAMPLE 51

3.4 Parts of methylcyclohexane-1,2-dicarboxylic anhydride, 2.5 parts of bis[4-N,N-di(2,3-epoxypropyl)aminophenyl]methane, 0.1 part of N,N-dimethylbenzylamine as a catalyst were dissolved in 10 parts of 1,1,2,2-tetrachloroethane. The resulting solution was cast on a glass plate, and heated at 180° C. for 1 hour in an atmosphere of nitrogen. A transparent resin was obtained.

When the resin was immersed for 5 minutes in 5N sulfuric acid and then irradiated with ultraviolet light for about 1 minute by using at 100 W UV lamp (UM102 made by Ushio Electrical Co., Ltd.), the resin turned transparent green. When the transparent green resin was heated at 230° C. for 2 minutes, it became transparent. It could be repeatedly colored and decolored by the above ultraviolet irradiation and heating.

EXAMPLE 52

The cured resin obtained as in Example 51 was immersed in boiling iodoethane, and impregnated with it for 5 minutes. When this transparent resin was irradiated with ultraviolet light for about 1 minute by using a 100 W UV lamp (UM102 made by Ushio Electrical Co., Ltd.), the transparent resin colored transparent green. When the transparent green resin was heated to 220° C. for 1 minute, it became transparent.

The above resin could be repeatedly colored and decolored by the above ultraviolet irradiation and heating.

EXAMPLE 53

1.95 Parts of phenol novolak having an average molecular weight of 400, 2.5 parts of bis[4-N,N-di(2,3-epoxypropyl)aminophenyl]methane, 1 part of iodoethane and 0.05 part of 2,4,6-tris(dimethylaminomethyl)phenol were dissolved in 20 parts of tetrachloroethane. The solution was cast on a glass plate, and heated at 180° C. for 1 hour in an atmosphere of nitrogen to cure the coating. The resulting resin was transparent.

When the transparent resin was irradiated with ultraviolet light for about 1 minute by using a 100 W UV lamp (UM102 made by Ushio Electrical Co., Ltd.), it colored transparent green. When the green transparent resin was heated at 240° C. for 2 minutes, it became transparent.

The resin could be repeatedly colored and decolored by the above ultraviolet irradiation and heating.

EXAMPLE 54

2.2 Parts of 4,4'-diaminodiphenylmethane and 4.5 parts of bisphenol A type epoxy compound having an epoxy equivalent of 195 g/eq. were well mixed, and the mixture was cast on a glass plate. After purging with nitrogen, the glass was heated at 200° C. for 30 minutes. The resulting resin was pale yellow.

Separately, a solution of 5 parts of ethyl p-toluenesulfonate in 100 parts of acetone was prepared, and the resulting resin was put in the solution and heated to impregnate the resin with ethyl p-toluenesulfonate. When the pale yellow resin as irradiated with ultraviolet light for 2 minutes at a distance of about 20 cm by using a 100 W UV lamp (UM-102 made by Ushio Electrical Co., Ltd.), it colored transparent green. When the green transparent resin was heated to 200° C. for 2 minutes, it became pale yellow and transparent. The resin could be repeatedly colored and decolored by the above ultraviolet irradiation and heating.

We claim:

1. An electrochromic resin composition comprising
(a) 100 parts by weight of a network comprising a crosslinked polymer containing bonded units represented by the following formula (I)

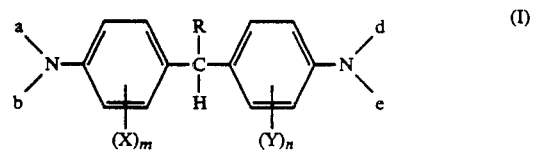

wherein R represents a hydrogen atom or a monovalent hydrocarbon group selected from the group consisting of alkyl, aralkyl, cycloalkyl and aryl groups, X and Y, independently from each other, represent a halogen atom, a nitro group, a monovalent hydrocarbon group selected from the group consisting of alkyl, aralkyl, cycloalkyl and aryl groups or a monovalent hydrocarbon-O-group wherein the monovalent hydrocarbon is selected from the group consisting of an alkyl, aralkyl, cycloalkyl and aryl groups, m and n, independently from each other, represent 0, 1, 2, 3 or 4, a, b, d and e are bonds which, independently from each other, are bonded to a hydrogen atom or to an aliphatic or alicyclic carbon, provided that at least one of these bonds is bonded to the aliphatic or alicyclic carbon,
in a form in which the amino groups in the formula are quaternized, and
(B) 5 to 150 parts by weight of an electrolytic material uniformly dispersed in the network (A) wherein the electrolyte is an alkali metal salt or an ammonium salt of an organic or inorganic acid.

2. The resin composition of claim 1 in which the aliphatic or alicyclic carbon to which at least one of the bonds a, b, d and e in formula (I) is bonded is present in the bonded units of formula (I) incorporated in the network chain of the crosslinked polymer, or in the bonded units of formula (I) as a pendant group from the network chain of the crosslinked polymer.

3. The resin composition of claim 1 in which bonds a and d in formula (I) are bonded to the aliphatic or alicyclic carbon whereby the bonded units of formula (I) are incorporated in the network chain of the crosslinked polymer.

4. The resin composition of claim 1 in which in formula (I), R represents a hydrogen atom, an alkyl group having 1 to 5 carbon atoms or a phenyl group, X and Y, independently from each other, represent a fluorine, chlorine, bromine, a nitro group, an alkyl group having 1 to 5 carbons atoms, or an alkoxy group having 1 to 5 carbon atoms, m and n, independently from each other, represent 0 or 1, and a, b, d and e are as defined above.

5. The resin composition of claim 1 in which the crosslinked polymer is a crosslinked epoxy resin derived from a mixture composed of
   (a) an epoxyamine compound represented by the following formula (II-1)

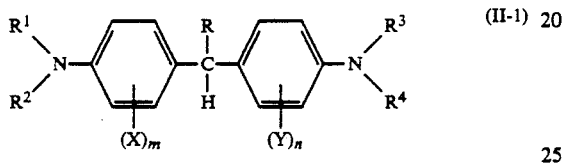

wherein R, X, Y, m and n are as defined with regard to formula (I), and $R^1$, $R^2$, $R^3$ and $R^4$ are identical or different and each represents a hydrogen atom, a monovalent hydrocarbon group having a 1,2-epoxy moiety, or a monovalent hydrocarbon group selected from the group consisting of alkyl, alkenyl, cycloalkenyl, cycloalkyl and alkyl groups which may be substituted by a substituent inert to the 1,2-epoxy moiety, with the proviso that at least one of $R^1$, $R^2$, $R^3$ and $R^4$ is the monovalent hydrocarbon group having a 1,2-epoxy moiety, and
   (b) a compound selected from the group consisting of amine compounds having at least two active hydrogens, polycarboxylic acids, intramolecular anhydrides of the polycarboxylic acids, polyphenols and poly(cyclic iminoethers), and in which the amino groups in formula (II-1) are in the quaternized state.

6. The resin composition of claim 5 in which the crosslinked polymer is a crosslinked epoxy resin obtained by ring-opening polymerization of an epoxyamine compound of formula (II-1) in which at least two of $R^1$ to $R^4$ are monovalent hydrocarbon groups having a 1,2-epoxy moiety or a mixture of it with another epoxy compound, and the amino group in formula (II-1) are quaternized.

7. The resin composition of claim 1 in which the crosslinked polymer is a crosslinked resin derived from a mixture composed of
   (a') an amine compound represented by the following formula (II-2)

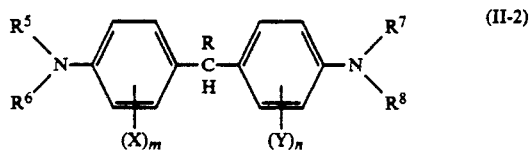

wherein R, X, Y, m and n are as defined hereinabove, and $R^5$, $R^6$, $R^7$ and $R^8$, independently from each other, represent a hydrogen atom or a monovalent hydrocarbon group selected from the group consisting of alkyl, aralkyl, cycloalkyl and aryl groups which may be substituted by a substituent other than a 1,2-epoxy group with the proviso that at least two of $R^5$, $R^6$, $R^7$ and $R^8$ are hydrogen atoms, and
   (b') a compound selected from the group consisting of poly(cyclic iminoethers), polyepoxy compounds and polyisocyanates, and in which the amino groups in formula (II-2) are in the quaternized state.

8. The resin composition of claim 1 in which the crosslinked polymer is a crosslinked resin obtained by addition-polymerization of an ethylenically unsaturated compound represented by the following formula (II-3)

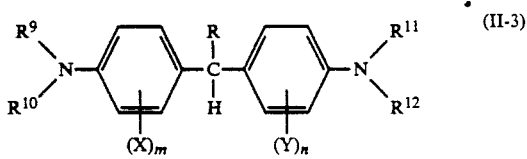

wherein R, X, Y, m and n are defined hereinabove, $R^9$, $R^{10}$, $R^{11}$ and $R^{12}$, independently from each other represent a hydrogen atom, a monovalent hydrocarbon group having an ethylenically unsaturated bond selected from the group consisting of aralkyl, aryl, alkenyl or cycloalkenyl groups, or a monovalent hydrocarbon group having no ethylenically unsaturated bond selected from the group consisting of alkyl and cycloalkyl groups, with the proviso that at least two of $R^9$ through $R^{12}$ are said monovalent hydrocarbon groups having an ethylenically unsaturated bond,
or a mixture of it with another ethylenically unsaturated compound and in which the amino groups in formula (II-3) are in the quaternized state.

9. An electrochromic display element comprising a pair of display electrodes each comprising a conductive transparent substrate and a conductive thin plate thereon, the two electrodes being arranged with an electrolyte medium therebetween; wherein one of the display electrodes is an electrode having a color formation layer composed of the resin composition of claim 1 as the conductive thin film, and the other display electrode is an electrode having a color formation layer composed of a transition metal oxide or a resin composition containing a viologen as the conductive thin film.

10. The electrochromic resin of claim 1 wherein the electrolyte is selected from the group consisting of the KBr, KCl, Cl, LiCl, $K_2SO_4$, $LiClO_4$, $KBF_4$, $KH_2PO_4$, $KNO_3$, $CH_3COOK$, cetyl trimethyl ammonium chloride, cetyl trimethyl ammonium bromide, tetramethyl ammonium perchlorate, tetrabutyl ammonium bromide, tetraethyl ammonium perchlorate and tetrabutyl ammonium perchlorate.

11. The resin composition of claim 1 wherein when R, X or Y is a hydrocarbon group or Y is a monovalent hydrocarbon-O-group the monovalent hydrocarbon group is selected from the group consisting of alkyl having 1 to 5 carbon atoms, aralkyl having 1 to 3 carbons in the alkyl group and the aryl is phenyl, cycloalkyl having 5–12 carbon atoms and aryl of from 6 to 12 carbon atoms.

12. The resin composition of claim 5 wherein the epoxyamine compound (a) is bis-N(4-N,N-di(2,3-epoxypropyl)aminophenyl)methane, bis(3-chloro-4,N,N-di(2,3-epoxypropyl)amino-phenyl)methane or bis(2-methyl-4,N,N-di(2,3-epoxypropyl)aminophenyl)methane.

13. The resin composition of claim 5 wherein compound (b) is an amine compound having at least two active hydrogens.

14. The resin composition of claim 13 wherein compound (b) is 4,4'-diamino-diphenyl methane.

15. The resin composition of claim 5 wherein compound (b) is an aliphatic or alicyclic polycarboxylic acid.

16. The resin composition of claim 5 wherein compound (b) is an intramolecular anhydride of an aliphatic or alicyclic polycarboxylic acid.

17. The resin composition of claim 5 wherein compound (b) is a polyphenol.

18. The resin composition of claim 5 wherein compound (b) is a poly (cyclic iminoether).

19. The resin composition of claim 7 wherein the amine compound (a') is 4,4'-diaminodiphenyl methane.

20. The resin composition of claim 8 wherein the monovalent hydrocarbon group having an ethylenically unsaturated bond is an allyl group.

* * * * *